US012616328B1

(12) United States Patent
Yigit

(10) Patent No.: US 12,616,328 B1
(45) Date of Patent: May 5, 2026

(54) APPARATUS FACILITATING BREWING OF BEVERAGES IN A CONTAINER

(71) Applicant: Zihni Enes Yigit, Irvine, CA (US)

(72) Inventor: Zihni Enes Yigit, Irvine, CA (US)

(73) Assignee: MIE Concepts INC, Irvine, CA (US)

( * ) Notice: Subject to any disclaimer, the term of this patent is extended or adjusted under 35 U.S.C. 154(b) by 0 days.

(21) Appl. No.: 19/338,032

(22) Filed: Sep. 24, 2025

(51) Int. Cl.
　　*A47J 31/06* (2006.01)
　　*A47J 31/20* (2006.01)
　　*A47J 31/44* (2006.01)

(52) U.S. Cl.
　　CPC ....... *A47J 31/0615* (2013.01); *A47J 31/0621* (2013.01); *A47J 31/20* (2013.01); *A47J 31/4407* (2013.01)

(58) Field of Classification Search
　　CPC .......... A47J 31/00; A47J 31/005; A47J 31/06; A47J 31/0605; A47J 31/0615; A47J 31/0621; A47J 31/0626; A47J 31/0636; A47J 31/0652; A47J 31/0673; A47J 31/0684; A47J 31/0689; A47J 31/10; A47J 31/14; A47J 31/18; A47J 31/20; A47J 31/36; A47J 31/3604; A47J 31/38; A47J 31/44; A47J 31/4403; A47J 31/4407
　　See application file for complete search history.

(56) References Cited

U.S. PATENT DOCUMENTS

| | | | | |
|---|---|---|---|---|
| 2,935,928 A | * | 5/1960 | Keating | A47J 31/20 |
| | | | | 99/287 |
| 2018/0192810 A1 | * | 7/2018 | Codispoti | A47J 31/0615 |
| 2019/0038065 A1 | * | 2/2019 | Tilton | A47J 31/20 |
| 2024/0300732 A1 | * | 9/2024 | Duman | A47J 31/0636 |

FOREIGN PATENT DOCUMENTS

| | | | | | |
|---|---|---|---|---|---|
| FR | 2714587 A3 | * | 7/1995 | | A47J 31/20 |

* cited by examiner

*Primary Examiner* — Hung D Nguyen
(74) *Attorney, Agent, or Firm* — Dhiraj Jindal; PATENT YOGI LLC

(57) ABSTRACT

An apparatus facilitating brewing of beverages in a container. The apparatus includes an apparatus container comprising a base cap and a side wall. The side wall defines an interior space. A bottom end of the side wall defines a bottom opening of the apparatus container. The base cap transitions the bottom opening between open states and a closed state. At least one portion of the side wall includes openings. The apparatus container disposed in the container with the bottom opening in the closed state brews beverages in the container. The apparatus container receives beverage ingredients in the interior space. The apparatus includes a plunger assembly coupled to a top end of the side wall, and includes a plunger handle and a plunger head. The plunger assembly moves the plunger head in the interior space based on forces applied to the plunger handle to brew the beverages.

16 Claims, 26 Drawing Sheets

APPARATUS FACILITATING BREWING OF BEVERAGES IN A CONTAINER

FIELD OF DISCLOSURE

The present disclosure relates to the field of food and beverage apparatus. More specifically, the present disclosure relates to an apparatus facilitating brewing of beverages in a container.

BACKGROUND

The field of beverage preparation systems, and more particularly to brewing apparatuses for preparing beverages such as coffee, tea, and other infused drinks. The given field is of significant importance because beverage brewing is a globally widespread activity that is closely tied to consumer convenience, consistency, and quality. The ability to reliably prepare beverages with desired taste, aroma, and nutritional attributes contributes to user satisfaction and supports the growing demand for personalized and high-quality beverage experiences.

A desirable objective in the given field is to provide brewing solutions that may offer precise control over the preparation process while also ensuring ease of use, hygiene, adaptability, and consistency. Achieving the given objective is critical to meet consumer expectations, support portability, and address the needs of both casual users and professionals.

However, existing beverage preparation systems encounter a number of limitations that hinder the realization of the given objective. Many brewing systems lack the capability to dynamically regulate infusion characteristics, resulting in beverages with inconsistent flavor or strength. Several devices also fail to adequately manage fluid flow, pressure balance, and ingredient infusion timing, leading to either under-extraction or over-extraction. Additionally, problems arise from inefficient agitation mechanisms that limit the uniform distribution of solutes and prevent optimal flavor release. Systems currently available are often inconvenient to disassemble and clean, which restricts long-term usability and hygiene.

Further, many conventional solutions do not incorporate mechanisms to prevent residue accumulation or microbial growth, raising concerns regarding safety and durability. Portable systems frequently lack the ability to operate with integrated intelligence or adaptive control, making them unable to adjust brewing conditions to changing circumstances or user preferences. Moreover, there are challenges in energy management, since handheld brewing systems rarely provide solutions for self-sustaining power to operate auxiliary features such as sensors or actuators. The absence of integrated monitoring and feedback also prevents users from achieving repeatable results.

Therefore, there is a need for an improved apparatus facilitating brewing of beverages in a container that may overcome one or more of the preceding problems.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides an apparatus facilitating brewing of beverages in a container. Further, the apparatus may include an apparatus container comprising a base cap and a side wall. Further, the side wall extends between a top end and a bottom end. Further, the side wall defines an interior space extending between the top end and the bottom end. Further, the bottom end defines a bottom opening of the apparatus container. Further, the base cap may be configured for transitioning the bottom opening between one or more open states and a closed state. Further, at least one portion of the side wall includes two or more openings. Further, the apparatus container may be configured to be disposed in the container with the bottom opening in the closed state for brewing one or more beverages in the container. Further, one or more brewing fluids disposed in the container move between the container and the interior space through one or more of the two or more openings. Further, the apparatus container may be configured for receiving one or more beverage ingredients in the interior space. Further, the apparatus may include a plunger assembly coupled to the top end of the side wall. Further, the plunger assembly includes a plunger handle and a plunger head. Further, the plunger assembly may be configured for moving the plunger head in the interior space based on one or more forces applied to the plunger handle. Further, the brewing of the one or more beverages may be further based on the moving of the plunger head in the interior space of the apparatus container.

The present disclosure provides an apparatus facilitating brewing of beverages in a container. Further, the apparatus may include an apparatus container comprising a base cap and a side wall. Further, the side wall extends between a top end and a bottom end. Further, the side wall defines an interior space extending between the top end and the bottom end. Further, the bottom end defines a bottom opening of the apparatus container. Further, the base cap may be configured for transitioning the bottom opening between one or more open states and a closed state. Further, at least one portion of the side wall includes two or more openings. Further, the apparatus container may be configured to be disposed in the container with the bottom opening in the closed state for brewing one or more beverages in the container. Further, one or more brewing fluids disposed in the container move between the container and the interior space through one or more of the two or more openings. Further, the apparatus container may be configured for receiving one or more beverage ingredients in the interior space. Further, the apparatus container includes a first side wall contactingly disposed with the side wall. Further, the side wall and the first side wall may be movably coupled using a wall coupling element. Further, at least one first portion of the first side wall includes two or more first openings. Further, the first side wall may be configured to be transitionable between two or more relative positions in relation to the side wall for varying a degree of overlap of the two or more openings with the two or more first openings. Further, the degree of overlap defines an effective open area of the two or more openings. Further, the one or more brewing fluids move between the container and the interior space through the effective open area of one or more of the two or more openings. Further, the apparatus may include a plunger assembly coupled to the top end of the side wall. Further, the plunger assembly includes a plunger handle and a plunger head. Further, the plunger assembly may be configured for moving the plunger head in the interior space based on one or more forces applied to the plunger handle. Further, the brewing of the one or more beverages may be further based on the moving of the plunger head in the interior space of the apparatus container.

The present disclosure provides an apparatus facilitating brewing of beverages in a container. Further, the apparatus may include an apparatus container comprising a base cap and a side wall. Further, the side wall extends between a top end and a bottom end. Further, the side wall defines an interior space extending between the top end and the bottom end. Further, the bottom end defines a bottom opening of the apparatus container. Further, the base cap may be configured for transitioning the bottom opening between one or more open states and a closed state. Further, at least one portion of the side wall includes two or more openings. Further, the apparatus container may be configured to be disposed in the container with the bottom opening in the closed state for brewing one or more beverages in the container. Further, one or more brewing fluids disposed in the container moves between the container and the interior space through one or more of the two or more openings. Further, the apparatus container may be configured for receiving one or more beverage ingredients in the interior space. Further, the apparatus may include a plunger assembly coupled to the top end of the side wall. Further, the plunger assembly includes a plunger handle and a plunger head. Further, the plunger assembly may be configured for moving the plunger head in the interior space based on one or more forces applied to the plunger handle. Further, the brewing of the one or more beverages may be further based on the moving of the plunger head in the interior space of the apparatus container. Further, the apparatus may include a flow control mechanism coupled with the apparatus container. Further, the flow control mechanism includes a flow control element and a flow control actuator. Further, the flow control actuator may be configured for transitioning the flow control element between an engaged state and a disengaged state. Further, the flow control element may be configured for removably covering the two or more openings based on the transitioning of the flow control element between the engaged state and the disengaged state for modulating a movement of the one or more brewing fluids between the container and the interior space through one or more of the two or more openings.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

Figure 4:
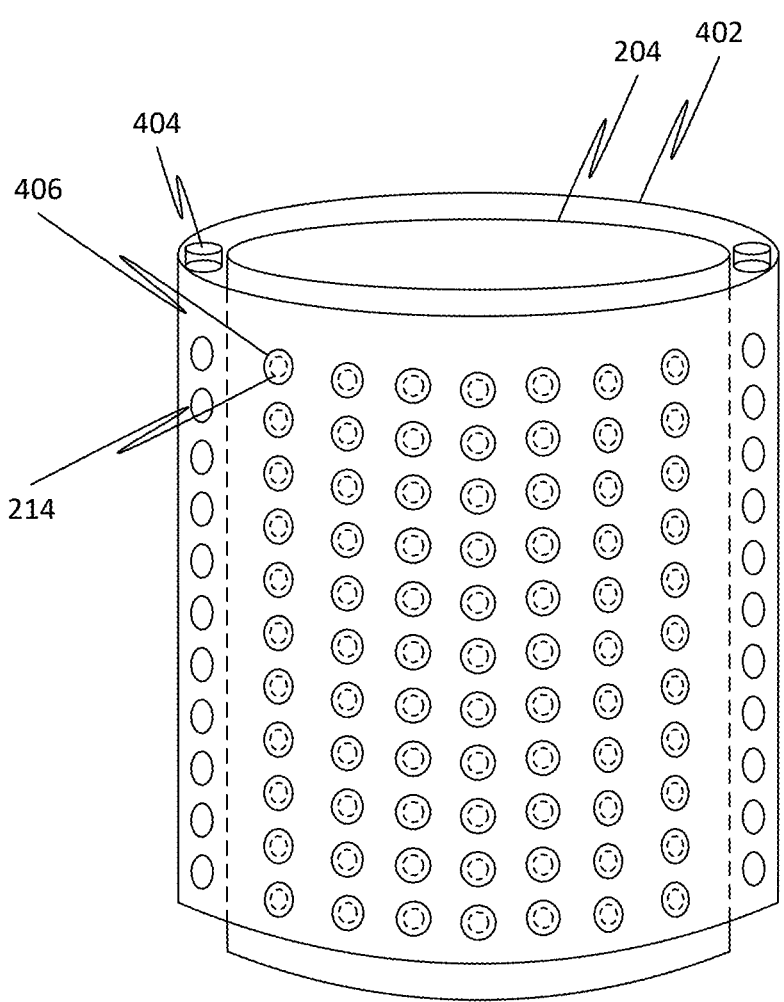

FIG. 4 is a perspective view of the apparatus container 102 of the apparatus 100, including a first side wall 402 contactingly disposed with the side wall 204 in a first relative position, in accordance with some embodiments.

Figure 5:
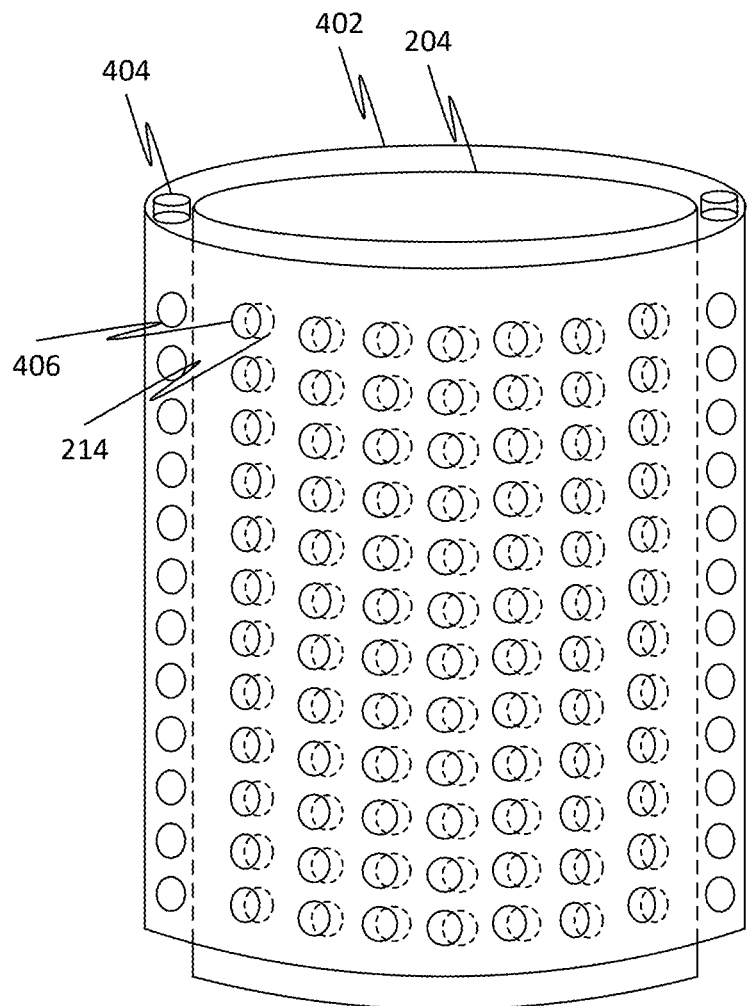

FIG. 5 is a perspective view of the apparatus container 102 of the apparatus 100, including the first side wall 402 contactingly disposed with the side wall 204 in a second relative position, in accordance with some embodiments.

Figure 6:
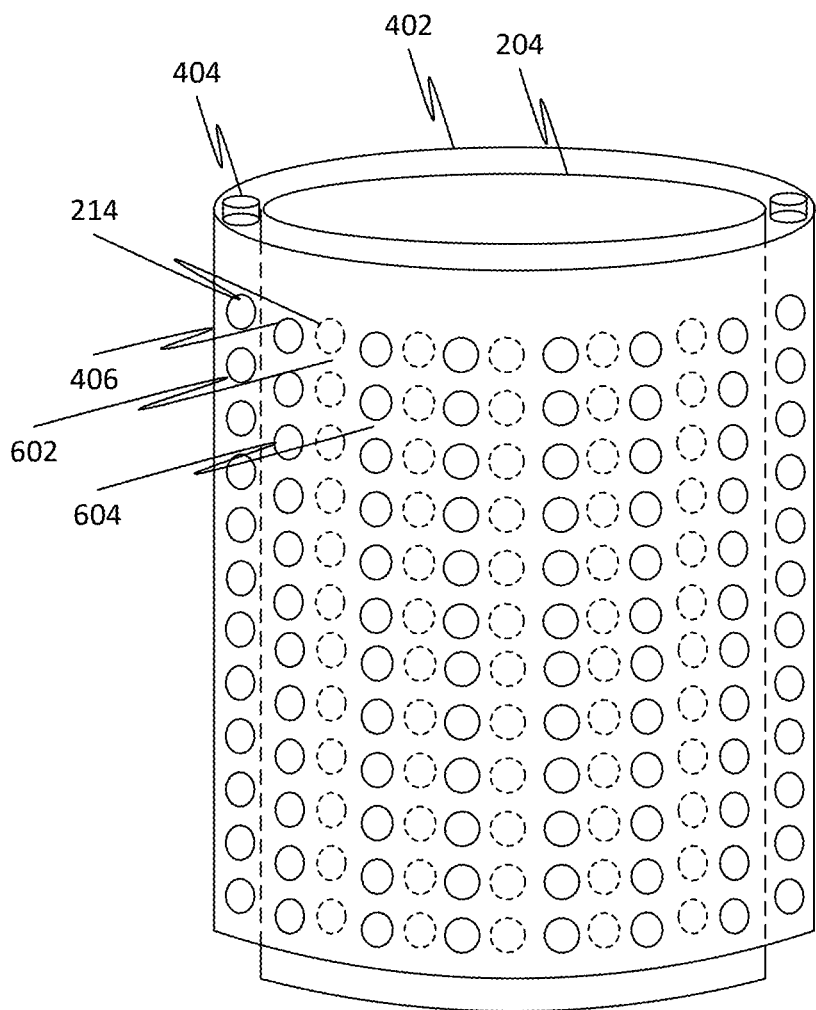

FIG. 6 is a perspective view of the apparatus container 102 of the apparatus 100, including the first side wall 402 contactingly disposed with the side wall 204 in a third relative position, in accordance with some embodiments.

Figure 7:
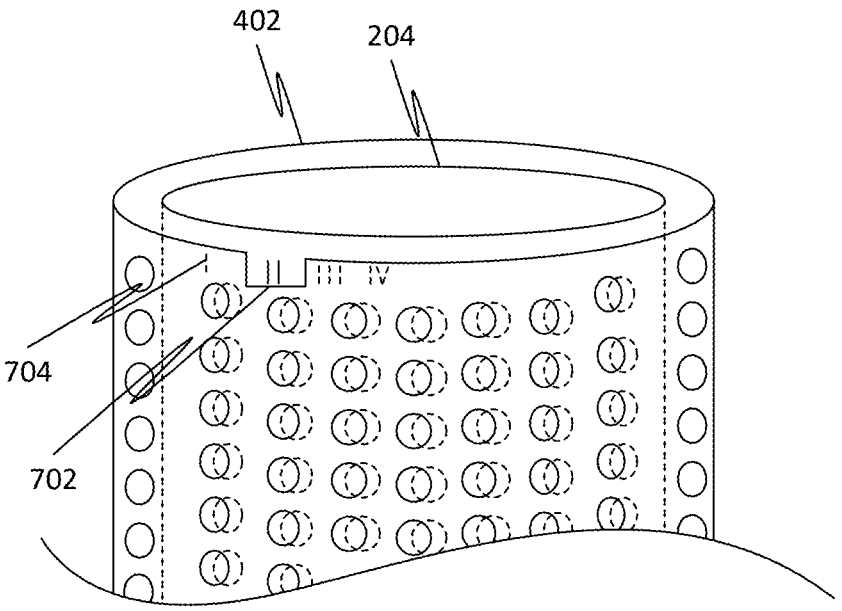

FIG. 7 is a partial perspective view of the apparatus container 102 of the apparatus 100, including an indexing element 702, in accordance with some embodiments.

Figure 8:
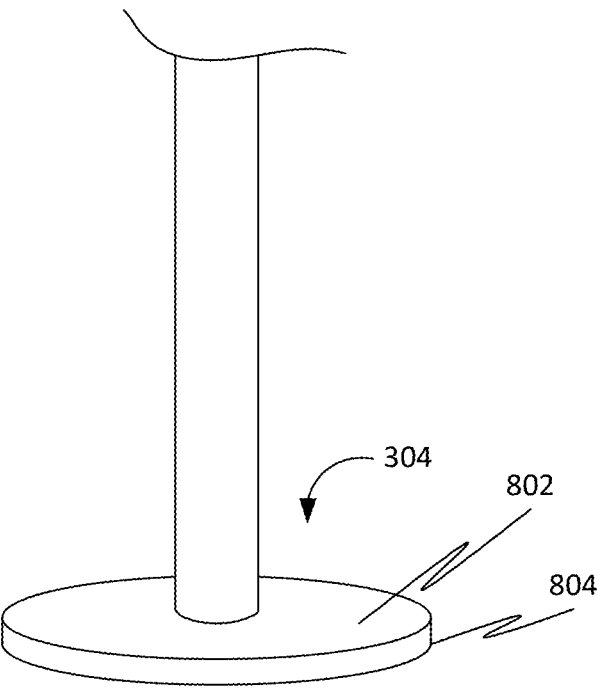

FIG. 8 illustrates a perspective view of a plunger head 304 including a circular plate 802, in accordance with some embodiments.

Figure 9:
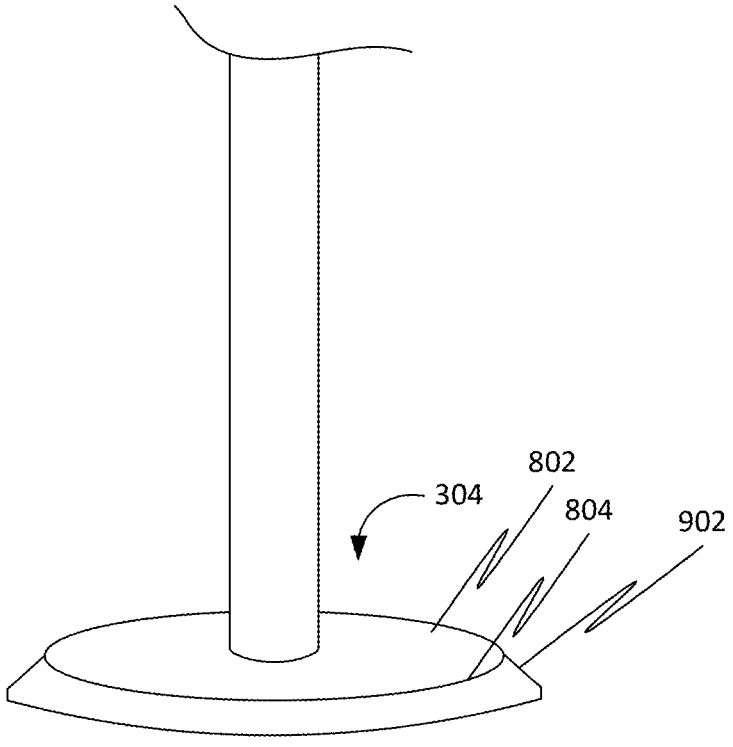

FIG. 9 illustrates a perspective view of the plunger head 304 including a skirting element 902, in accordance with some embodiments.

Figure 10:
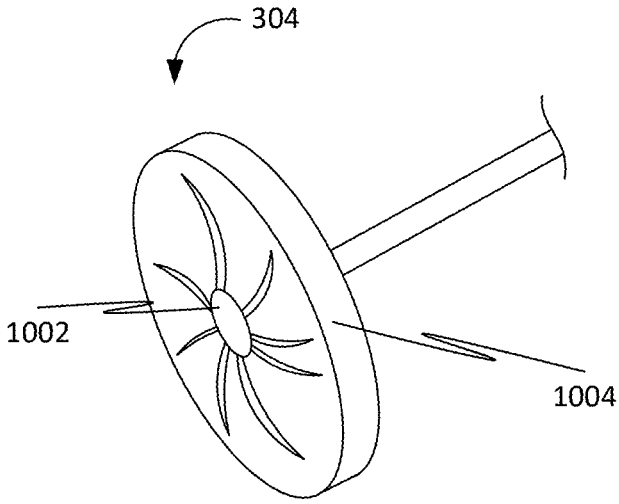

FIG. 10 illustrates a bottom perspective view of the plunger head 304 including one or more blades 1002, in accordance with some embodiments.

Figure 11:
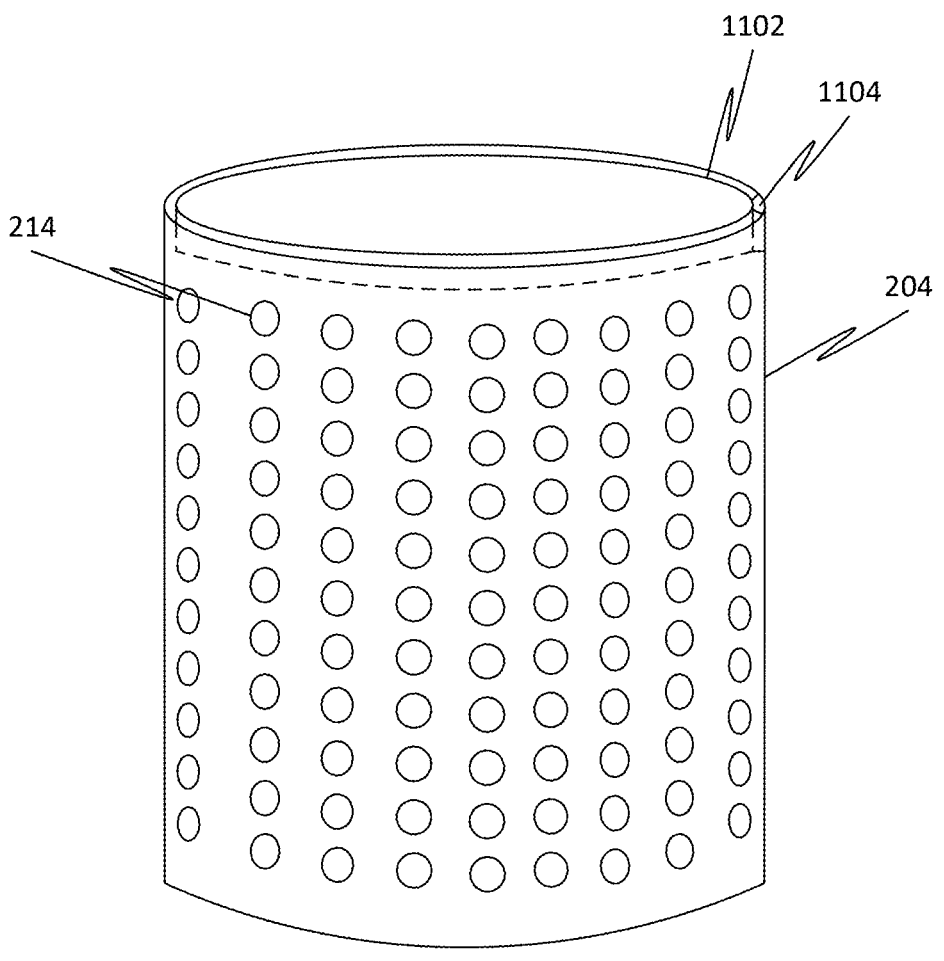

FIG. 11 is a perspective view of the apparatus container 102 of the apparatus 100, including a flow control mechanism in a first engaged state, in accordance with some embodiments.

Figure 12:
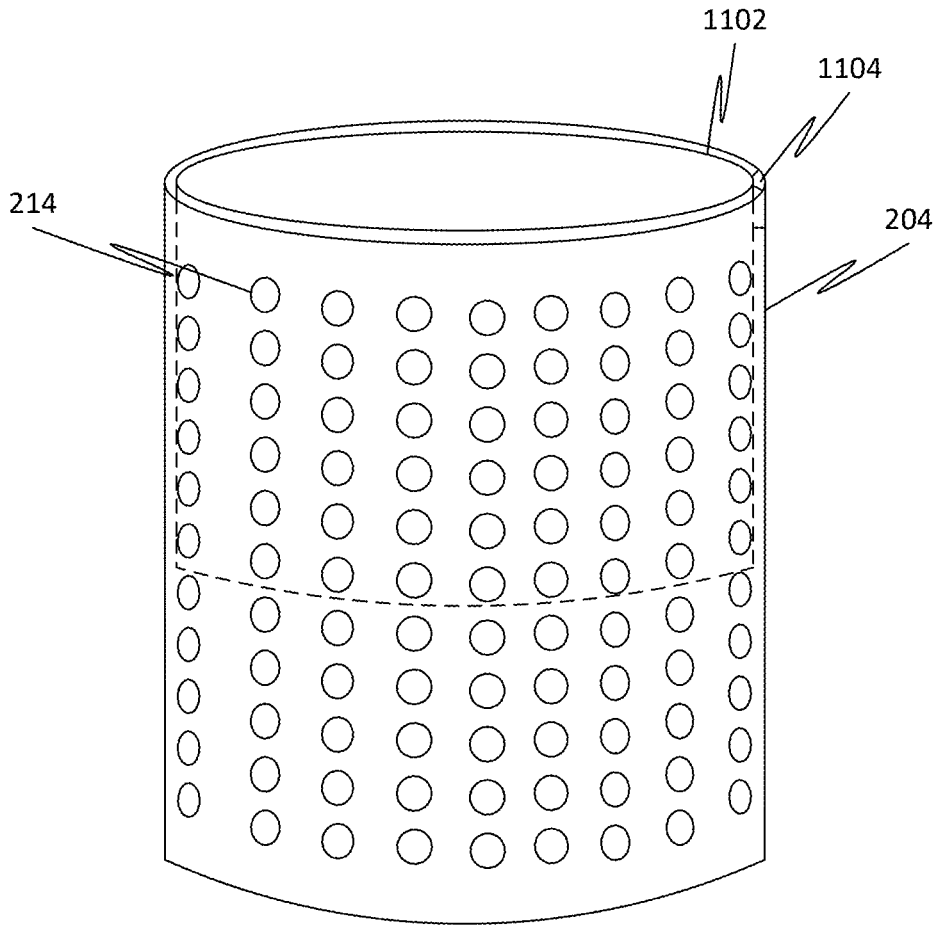

FIG. 12 is a perspective view of the apparatus container 102 of the apparatus 100, including the flow control mechanism in a second engaged state, in accordance with some embodiments.

Figure 13:
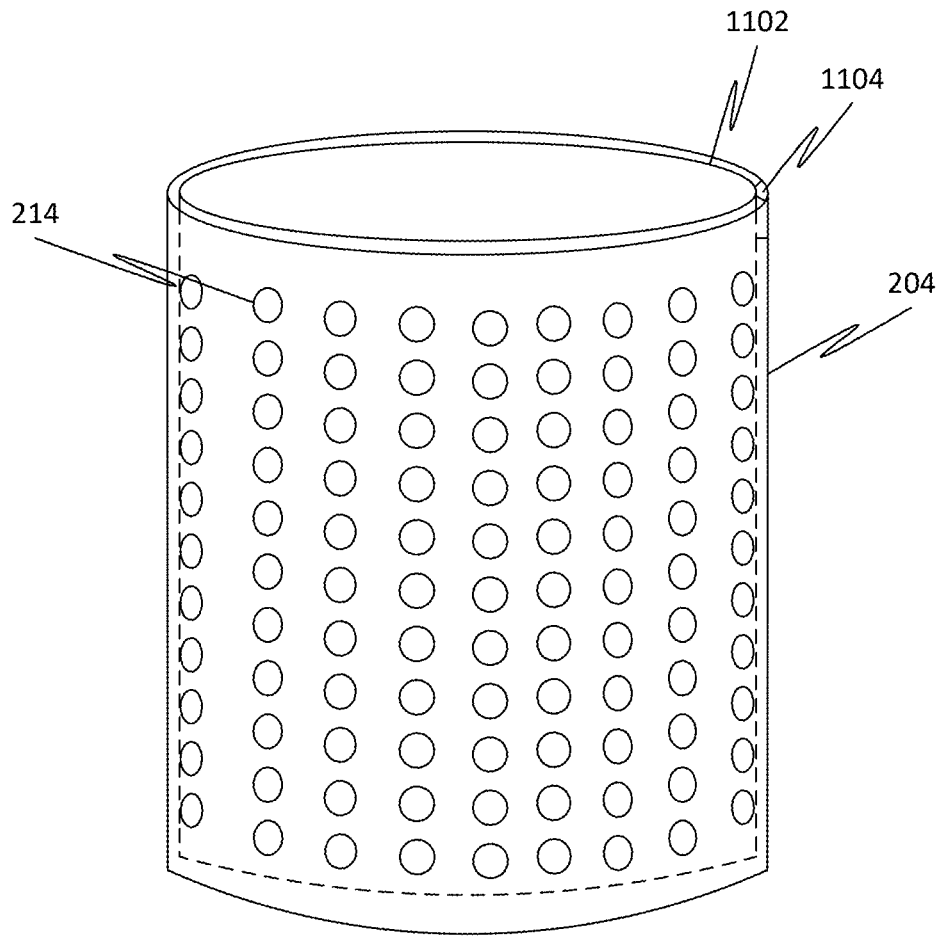

FIG. 13 is a perspective view of the apparatus container 102 of the apparatus 100, including the flow control mechanism in a third engaged state, in accordance with some embodiments.

Figure 14:
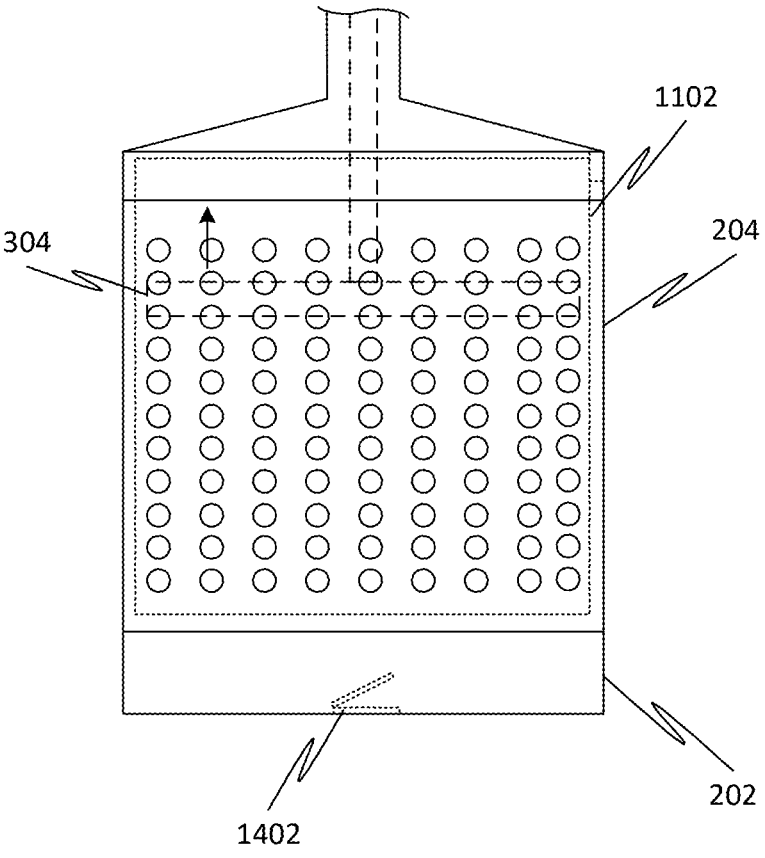

FIG. 14 is a front view of the apparatus 100 including one or more one-way valves 1402 in an open configuration during an upward motion of the plunger head 304 in an interior space 212, in accordance with some embodiments.

Figure 15:
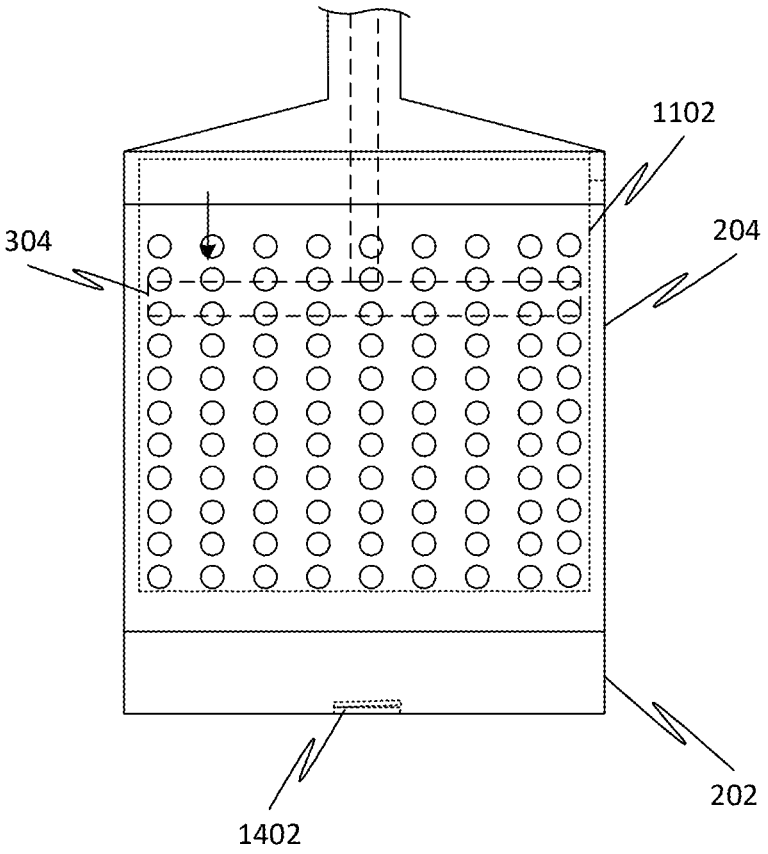

FIG. 15 is a front view of the apparatus 100 including the one or more one-way valves 1402 in a closed configuration during a downward motion of the plunger head 304 in the interior space 212, in accordance with some embodiments.

Figure 16:
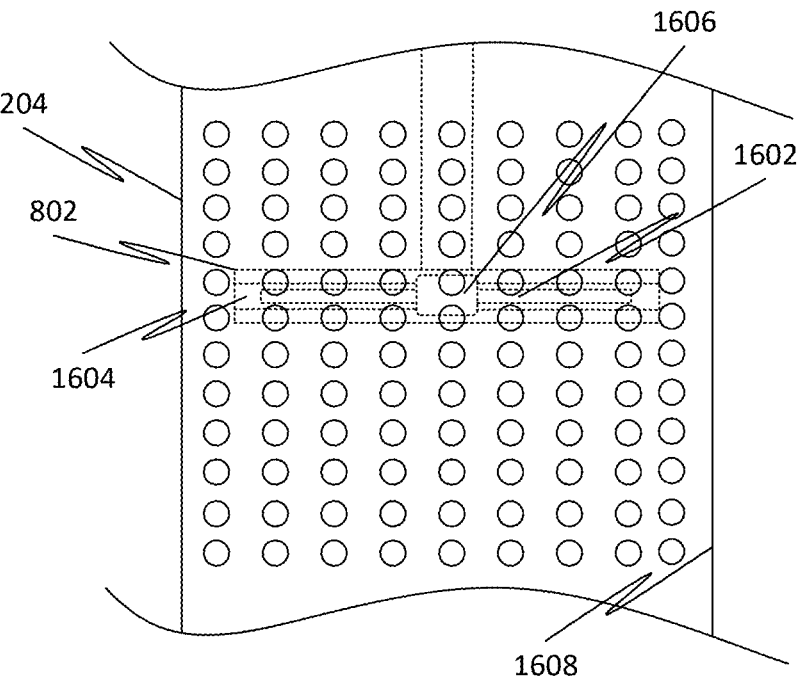

FIG. 16 is a partial front view of the apparatus 100 including a scraping element 1602 in a retracted position, in accordance with some embodiments.

Figure 17:
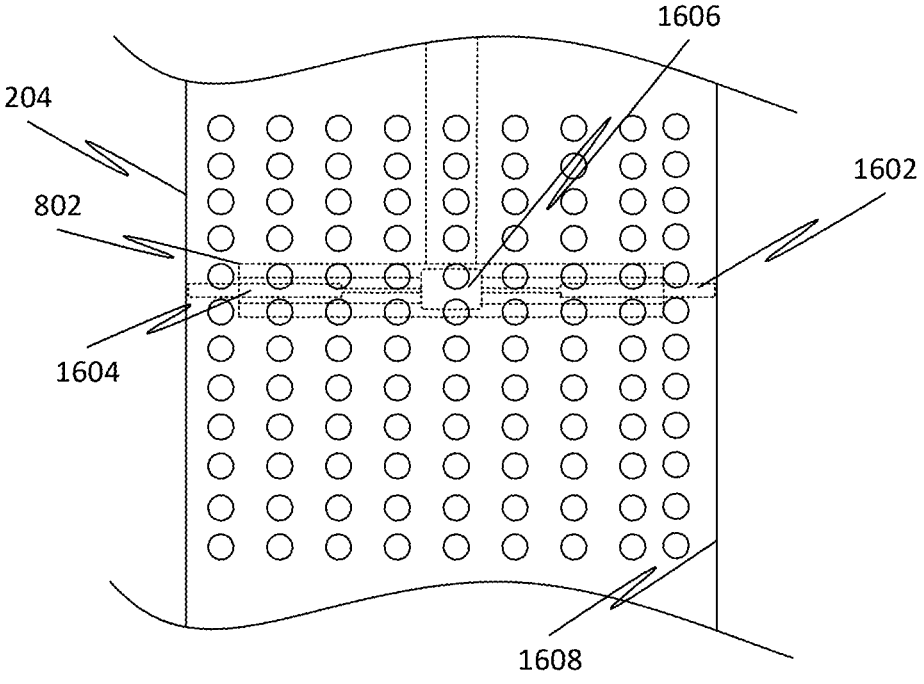

FIG. 17 is a front view of the apparatus 100 including the scraping element 1602 in an extended position, in accordance with some embodiments.

Figure 18:
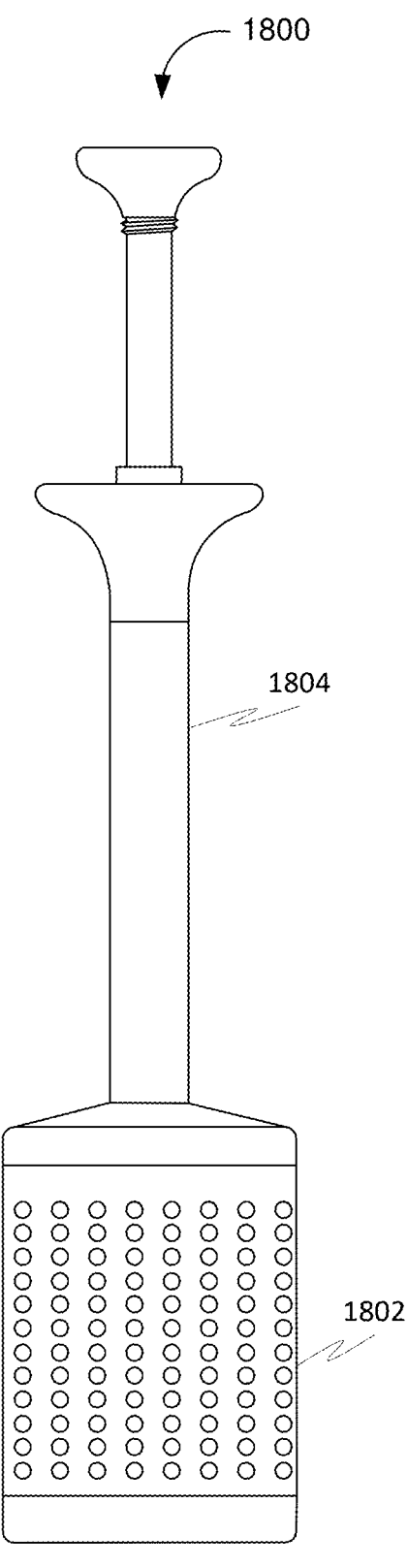

FIG. 18 is a front view of an apparatus 1800 for facilitating brewing of beverages in a container, in accordance with some embodiments.

Figure 19:
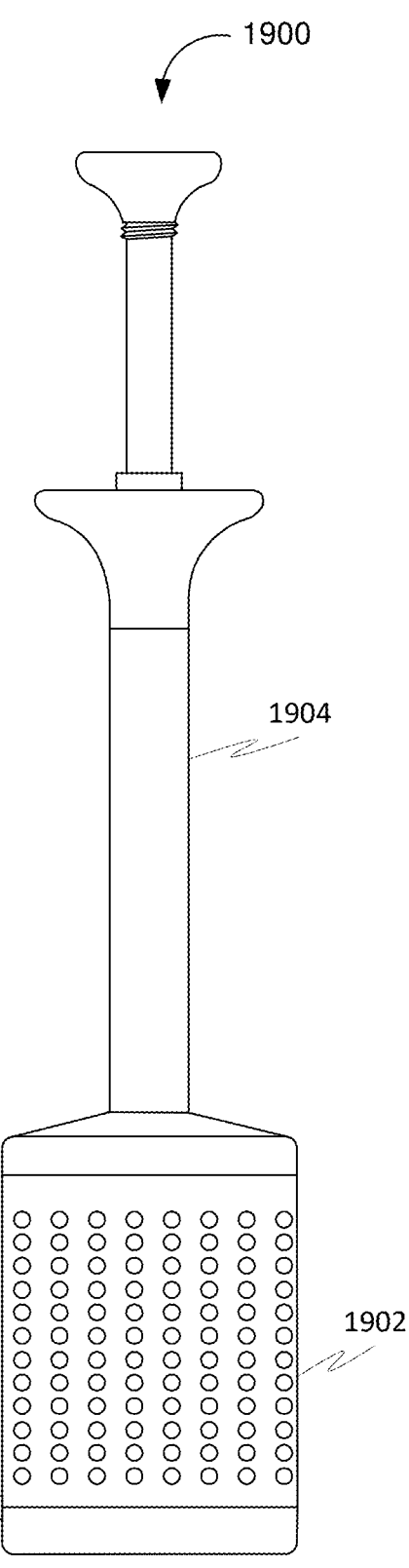

FIG. 19 is a front view of an apparatus 1900 for facilitating brewing of beverages in a container, in accordance with some embodiments.

Figure 20:
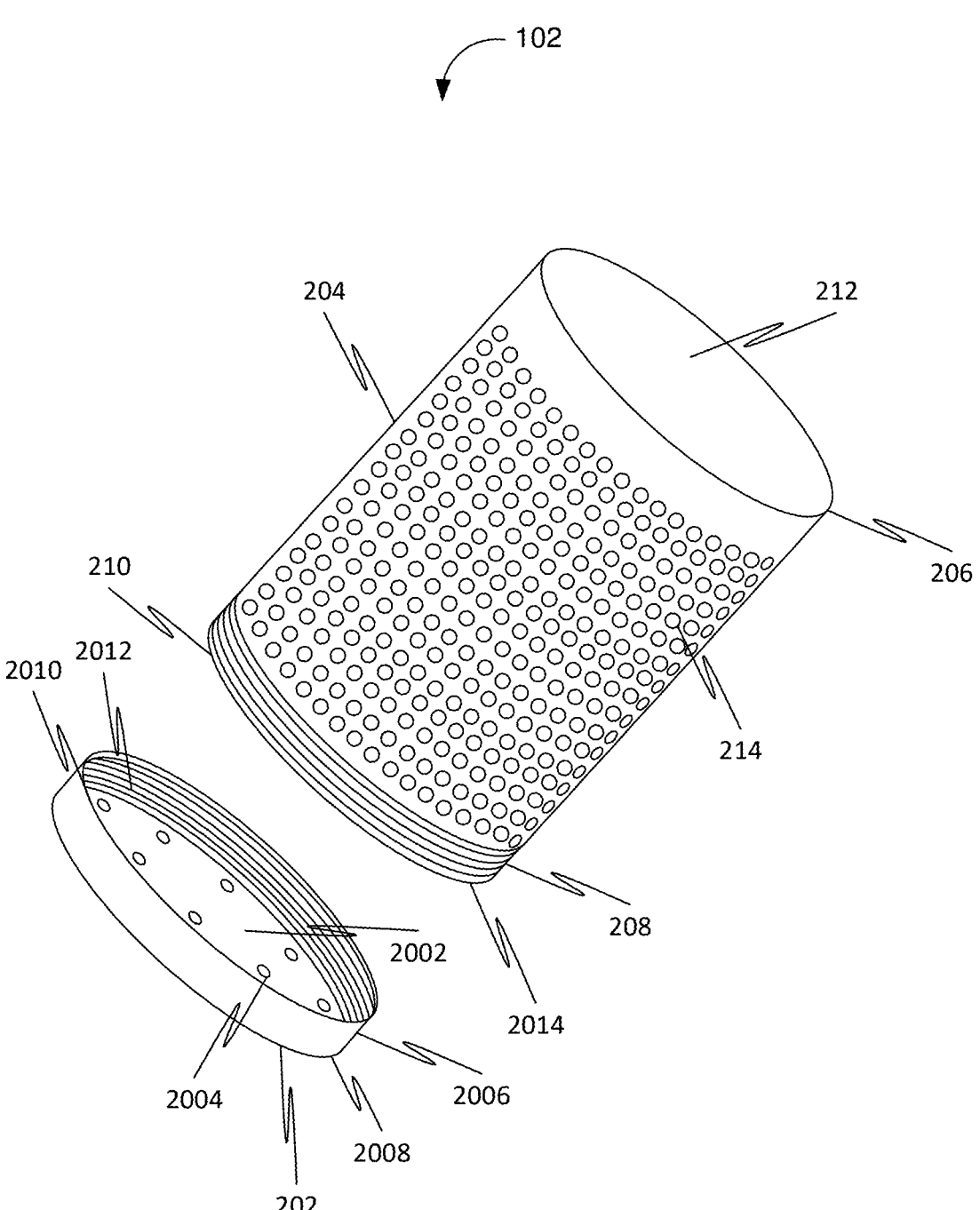

FIG. 20 illustrates the base cap 202 removably coupled to the side wall 204, in accordance with some embodiments.

Figure 21:
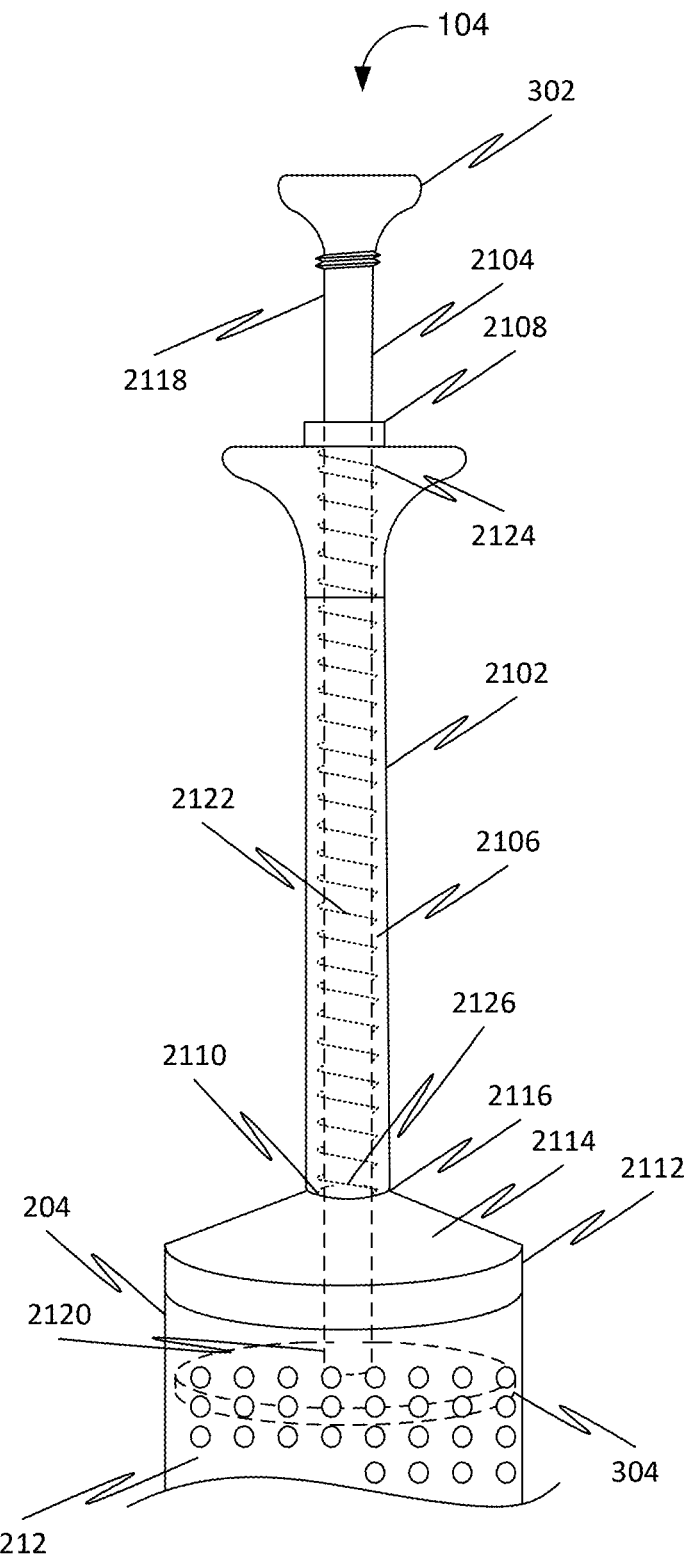

FIG. 21 is a front view of the plunger assembly 104 of the apparatus 100, in accordance with some embodiments.

Figure 22:
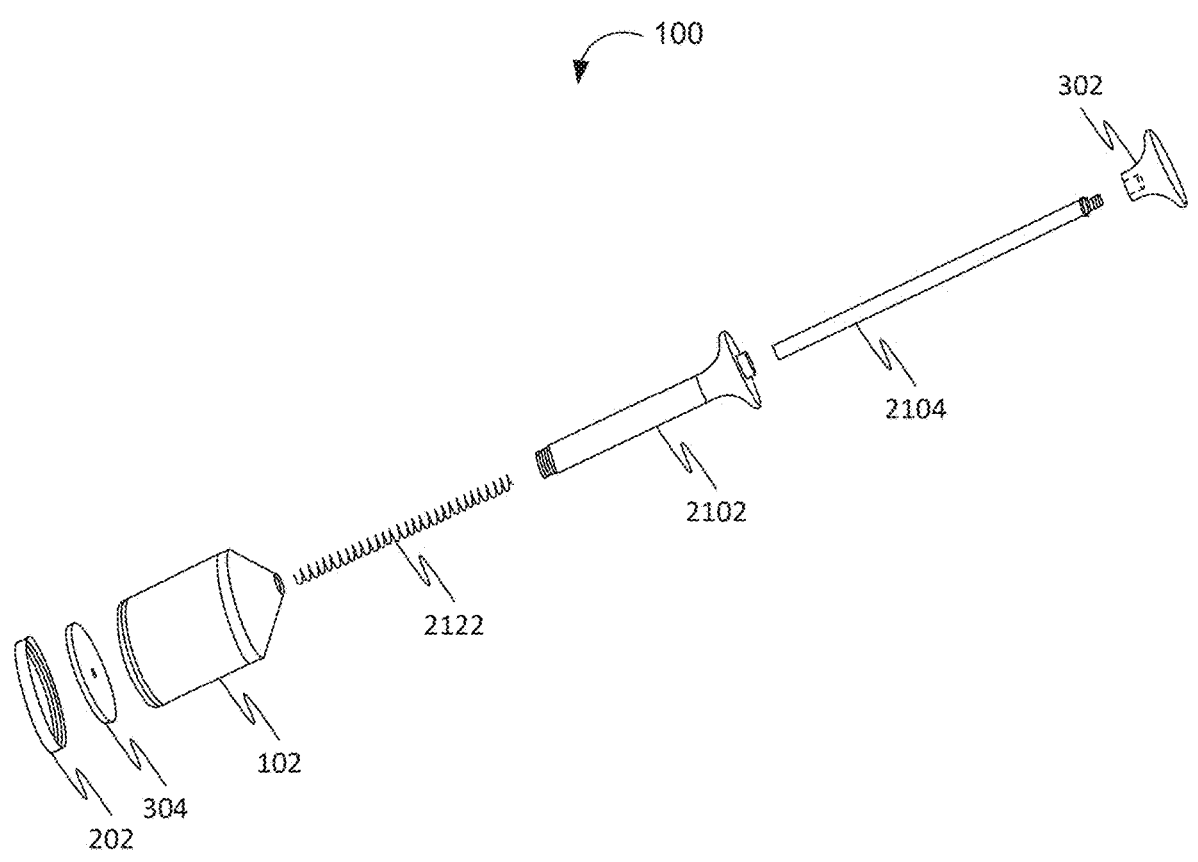

FIG. 22 is an exploded view of the apparatus 100, in accordance with some embodiments.

Figure 23:
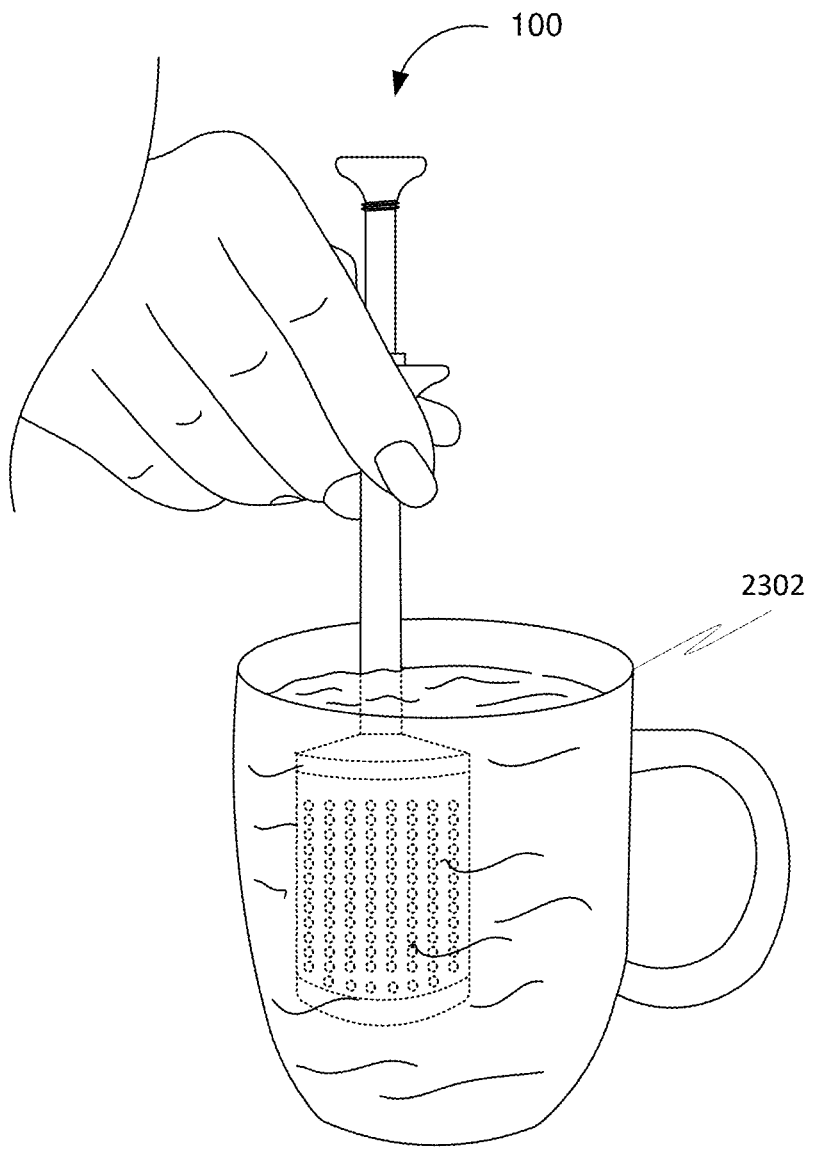

FIG. 23 is a front view of the apparatus 100 disposed in the container 2302 for the brewing of the at least one beverage in the container 2302, in accordance with some embodiments.

Figure 24:
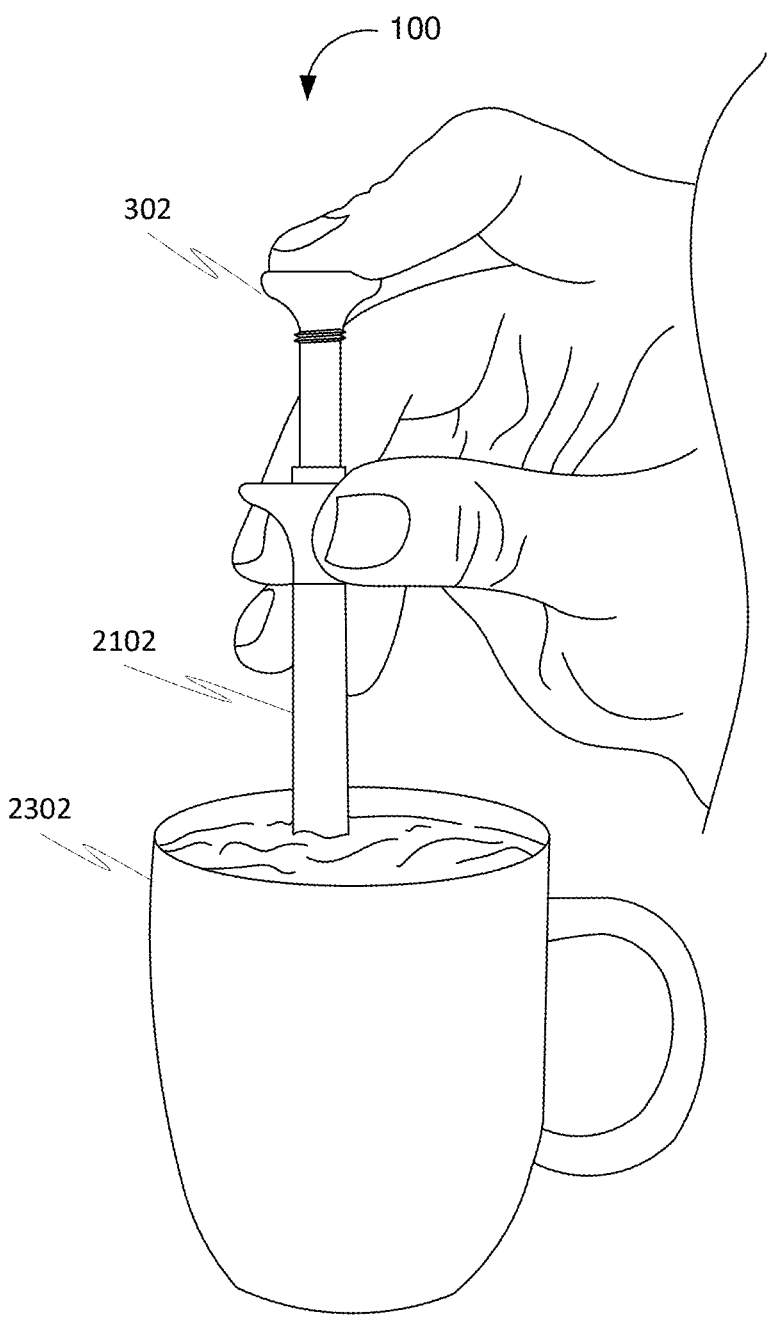

FIG. 24 is a front view of the apparatus 100 disposed in the container 2302 for the brewing of the at least one beverage in the container 2302 based on the at least one force applied to the plunger head 304 by a hand of the user, in accordance with some embodiments.

Figure 25:
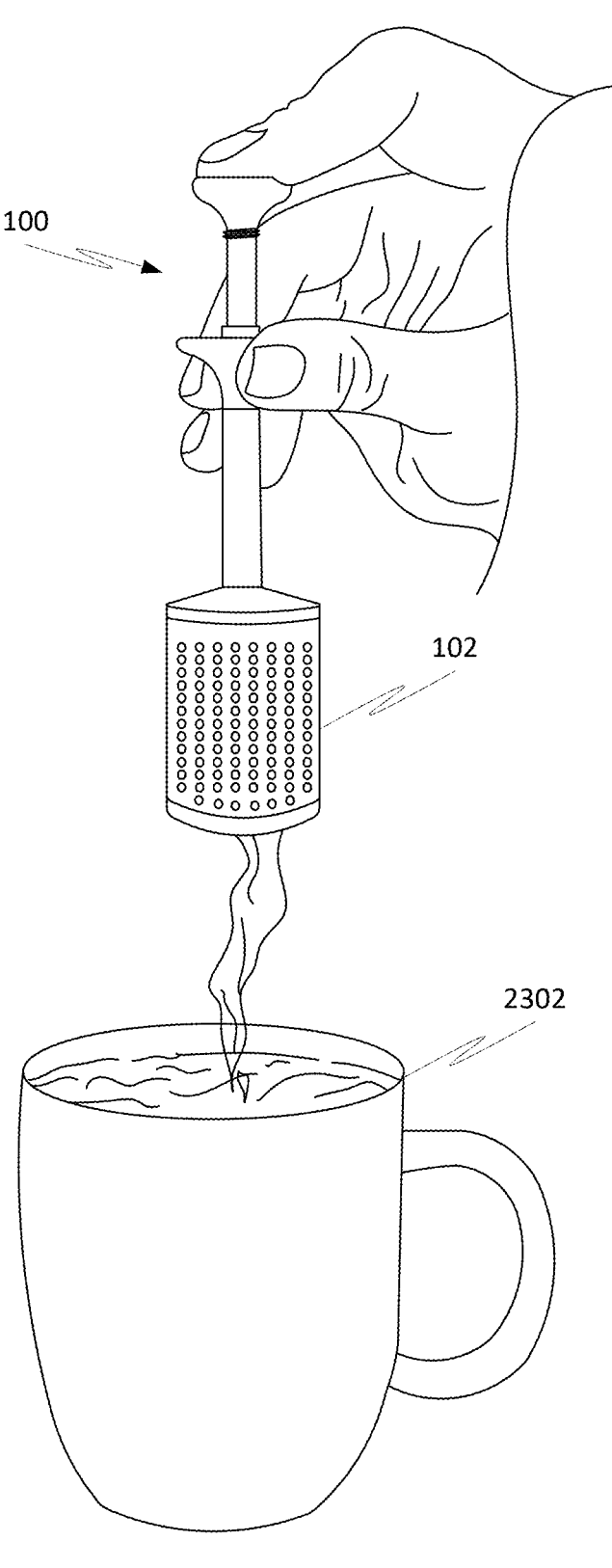

FIG. 25 is a front view of the apparatus 100 removed from the container 2302 after the brewing of the at least one beverage in the container 2302, in accordance with some embodiments.

Figure 26:
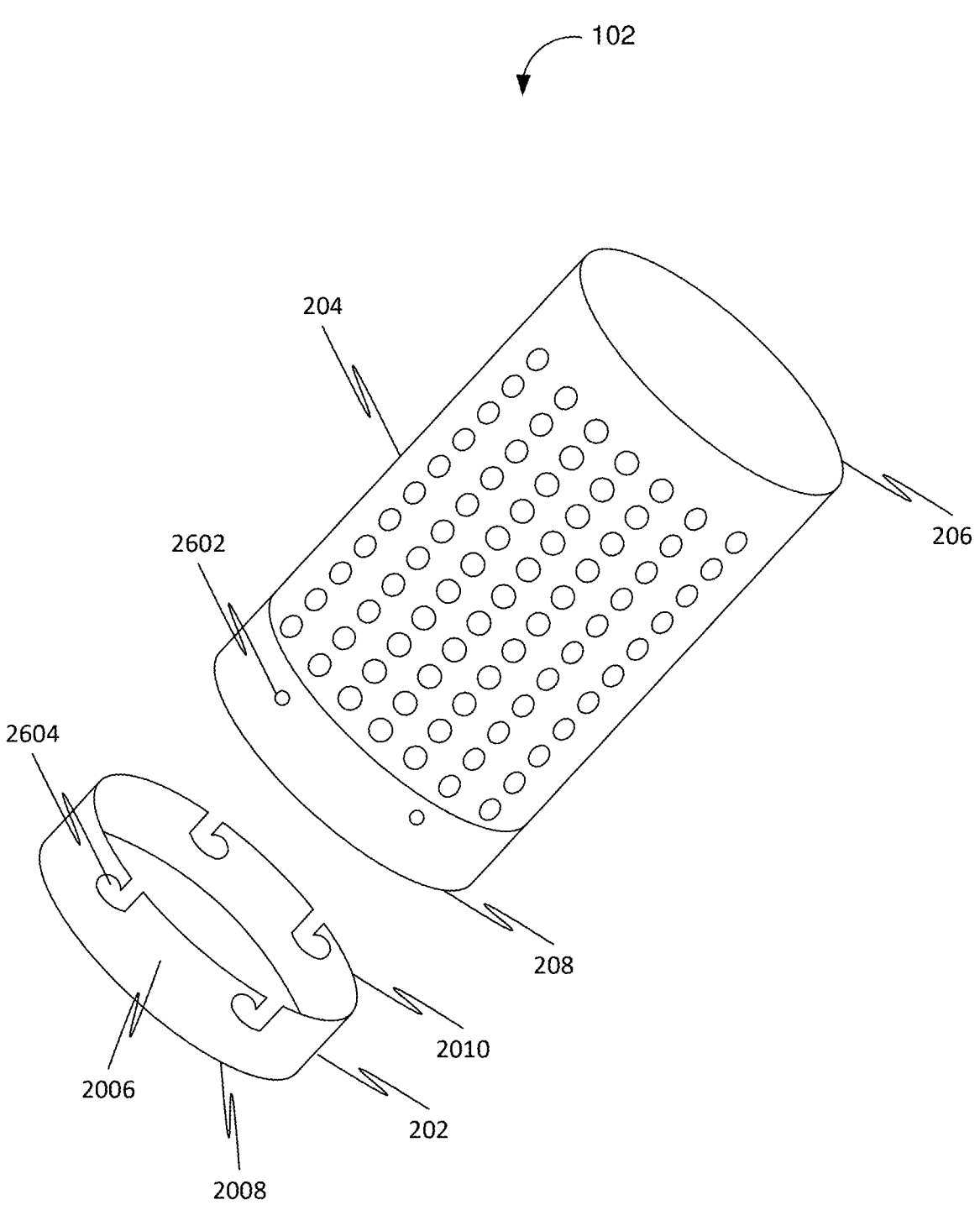

FIG. 26 illustrates the base cap 202 removably coupled to the side wall 204 using a bayonet connector, in accordance with some embodiments.

DETAILED DESCRIPTION OF DISCLOSURE

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

Overview

The present disclosure describes apparatuses and methods for facilitating brewing of beverages in a container.

Further, the present disclosure describes a FinalPress Coffee and Tea Brewer. Further, the FinalPress Coffee and Tea Brewer relates to the field of coffee, cold brew, and tea brewing devices, specifically a manual press plunger for extracting flavors from coffee grounds and tea leaves. Further, the FinalPress Coffee and Tea Brewer provides a manual press plunger in a cup that allows users to adjust the pressure and extraction time, thereby enabling a more personalized brewing experience.

Further, the FinalPress Coffee and Tea Brewer comprises several key components that work together to extract flavors from coffee grounds and tea leaves. Further, the components of the FinalPress Coffee and Tea Brewer may include a detachable filter. Further, the filter effectively separates coffee grounds or tea leaves from the brewed beverage, ensuring a clean and flavorful result. Users may place the desired amount of coffee grounds or tea leaves into the filter, allowing for customization of taste preferences. Further, the components of the FinalPress Coffee and Tea Brewer may include a plunger system. Further, the plunger system serves as the core mechanism of the FinalPress Coffee and Tea Brewer and consists of a plunger with a handle and a plunger head, enabling controlled pressure and extraction during the brewing process. Further, the FinalPress Coffee and Tea Brewer brews coffee and tea in the cup to eliminate any mess.

Further, the present disclosure describes a method for brewing beverages using the FinalPress Coffee and Tea Brewer. Further, the method may include the following steps:

1. Adding water to a cup or mug.
2. Place the desired amount of coffee grounds or tea leaves into the filter.
3. Close the filter onto the brewing plunger system, ensuring a secure fit.
4. Stirring the coffee grounds or tea leaves in the cup or mug by holding them from the top of the plunger pipe to facilitate extraction and enhance flavor.
5. Allow the mixture to steep for the recommended duration to achieve the desired taste preferences.
6. Finally, applying downward pressure on the plunger using the handle to extract flavors from the coffee grounds or tea leaves and produce a well-brewed beverage.

Further, the FinalPress Coffee and Tea Brewer or the FinalPress Portable Coffee and Tea Brewing Tool is an innovative solution for the on-the-go brewing of coffee and tea. Further, the FinalPress Coffee and Tea Brewer offers convenience and customization to coffee, cold brew, and tea enthusiasts due to a compact design, detachable filter, and user-friendly plunger system. Further, the FinalPress Coffee and Tea Brewer addresses the need for a portable and versatile brewing tool. Further, the FinalPress Coffee and Tea Brewer is made up of stainless steel as the primary material to enhance strength and longevity.

Further, the FinalPress Coffee and Tea Brewer provides a more convenient brewing solution. Further, the FinalPress Coffee and Tea Brewer offers compactness and portability, ideal for travel and on-the-go use. Further, the FinalPress Coffee and Tea Brewer is a compact and portable coffee and tea brewing device designed to brew a single cup directly in the cup itself, eliminating the need for additional containers or filters. The spring plunger system of the FinalPress Coffee and Tea Brewer allows users to control the density or strength of their drink by pressing the plunger multiple times, enabling customization of the strength and intensity of tea or coffee to individual preferences. The spring plunger is manually pressed by hand, pushing through the coffee or tea in the stainless steel filter below to extract hidden flavors and oils directly into the cup. To use the FinalPress Coffee and Tea Brewer, the user adds the desired amount of coffee grounds or tea leaves into the stainless steel filter. The plunger system then screws on top of the filter. The device is placed in hot water, stirred, and left to steep for two minutes, and then the plunger is pressed to complete the brewing process. The stainless steel filter with 200-micron holes efficiently separates the coffee grounds or tea leaves from the brewed beverage, eliminating the need for additional waste-generating materials. The high-quality stainless steel construction ensures durability and resistance to corrosion, suitable for long-term use. With the FinalPress Coffee and Tea Brewer, coffee or tea may be brewed directly in the cup, eliminating the need for additional containers and minimizing mess. The given streamlined approach of the FinalPress Coffee and Tea Brewer simplifies the brewing process and enhances the overall user experience. Furthermore, the FinalPress Coffee and Tea Brewer eliminates the need for replaceable paper filters, as the FinalPress Coffee and Tea Brewer is made of stainless steel. Not only reducing waste but also ensuring durability and ease of use.

Further, the FinalPress Coffee and Tea Brewer addresses the limitations of traditional brewing methods and provides a unique and improved solution for coffee and tea enthusiasts. Further, the FinalPress Coffee and Tea Brewer's compact design, control over density, mess-free brewing, and use of stainless steel materials make the FinalPress Coffee and Tea Brewer a versatile and user-friendly option for brewing a cup of coffee or tea.

In some embodiments, the apparatus may include a removable bottom lid for easy cleaning. Further, the apparatus may include a finger grip on the handle.

Further, in some embodiments, the apparatus may include a modified top knob/handle, a new finger-grip flange, and a removable bottom lid. Further, the removable bottom lid under the filter allows customers to clean the apparatus more easily. By removing the removable bottom lid and pressing the plunger, the used coffee grounds may be discharged directly into the trash bin.

In some embodiments, the present disclosure may describe an in-cup brewing apparatus comprising an apparatus container having a base and a side wall defining an interior ingredient chamber and an open top, the side wall including a filter portion through which brewing fluid may pass. Further, the disclosed apparatus may include an end cap removably secured to the open top to close the apparatus container. Further, the disclosed apparatus may include a plunger assembly carried by the end cap and comprising a plunger head movable between (i) a cap-interior location within the end cap and (ii) the interior ingredient chamber to displace brewing fluid through the filter portion. Further, the disclosed apparatus may include a variable-aperture filter system integrated into the filter portion and comprising a first perforated cylindrical sleeve and a second perforated cylindrical sleeve coaxially disposed and radially overlapping along at least a majority of the axial height of the filter portion, the sleeves being rotatable relative to one another about a common axis while the apparatus container remains assembled, the perforation patterns being arranged such that relative angular position changes a total open area exposed to the interior ingredient chamber.

Further, the disclosed apparatus may include an indexing mechanism that positively locates the sleeves at multiple discrete aperture settings labeled to correspond to coarse, medium, and fine flow, and wherein the sleeves maintain a constant cylindrical outer envelope so that the apparatus container fits within a drinking mug at each setting.

Further, the indexing mechanism may include a radially biased spring-ball detent engaging a toothed ring on one sleeve.

Further, the perforations of the first sleeve are elongated slots in a first helical orientation, and the perforations of the second sleeve are elongated slots in an opposite helical orientation.

Further, at the "fine" setting, the effective average aperture is between 80 μm and 180 μm, and at the "coarse" setting, the effective average aperture is between 250 μm and 600 μm.

Further, the present disclosure describes a method of brewing comprising positioning the apparatus in a mug containing brewing fluid, loading beverage ingredients into the interior ingredient chamber, selecting one of the discrete aperture settings by rotating one sleeve relative to the other, and repeatedly moving the plunger head into the interior ingredient chamber to express brewed liquid through the selected-aperture filter portion.

Further, in some embodiments, the plunger head comprises a rigid core and an annular elastomeric skirt circumscribing the core. Further, the annular elastomeric skirt has a downward-and-outward canted lip sized to form a sliding interference with the interior ingredient chamber wall during a downward stroke and to relax during an upward return. Further, during the downward stroke, the annular elastomeric skirt establishes a circumferential seal that substantially prevents axial bypass of brewing fluid around the head and forces fluid to traverse the beverage ingredient bed and exit through the side-wall filter portion, and during the upward stroke, the annular elastomeric skirt admits backflow to refill above the head without lifting the apparatus.

Further, the annular elastomeric skirt is silicone, having a Shore A durometer includes radial relief notches that close under compression. Further, the rigid core includes a dovetail groove capturing a bead of the annular elastomeric skirt to resist pull-off. Further, the annular elastomeric skirt outer diameter exceeds the interior ingredient chamber diameter by 0.1-0.6 mm in a free state.

Further, the method comprises driving the plunger head downward so that the skirt seals to the chamber wall and urges fluid through the ingredient bed, and allowing the spring to return the head upward while the skirt relaxes to admit replenishment flow.

Further, in some embodiments, the end cap includes a valved flow port through the cap base, the flow port containing a one-way valve and configured to admit brewing fluid into the interior space of the apparatus container when the plunger head moves upward and to block fluid discharge through the flow port when the plunger head moves downward. Further, the reciprocation of the plunger head produces a pump-like cycle that alternately draws brewing fluid into the interior space and forces fluid through the beverage ingredients and side-wall filter portion.

Further, in an embodiment, the side wall does not include openings or side-wall filter portion. Further, the brewing fluid is admitted into the interior space through the flow port containing the one-way valve when the plunger head moves upward, and to block fluid discharge through the flow port when the plunger head moves downward. Further, the reciprocation of the plunger head produces the pump-like cycle that alternately draws brewing fluid into the interior space and agitates the beverage ingredients.

Further, in an embodiment, a flow state of the one-way valve is configured to be transitioned between a first flow state and a second flow state to change a flow direction for the one-way valve between a first flow direction and a second flow direction. In the first flow state, the brewing fluid moves from the exterior of the apparatus container to the interior space, and in the second flow state, the brewing fluid moves from the interior space to the exterior.

Further, the brewing fluid is admitted into the interior space based on the first flow state of the one-way valve. Further, the brewing fluid is discharged from the interior space based on the second flow state. Further, the brewing fluid is discharged when the plunger head moves downward. Further, openings associated with the one-way valve allow the discharge of the brewing liquid without the brewing ingredients. Further, the one-way valve is a duckbill valve formed of elastomer. Further, the end cap includes an internal baffle that directs admitted fluid radially outward across the plunger head during the downward stroke. Further, the end cap also includes a pressure-relief feature set to open above 15 kPa.

Further, the method comprises positioning the apparatus in a mug and cyclically moving the plunger head so that the check-valved cap base admits fluid on each up-stroke and blocks discharge on each down-stroke, thereby pulsing fluid through the ingredient bed.

Further, in some embodiments, the apparatus comprises an externally adjustable stop that sets a maximum linear travel of a handle rod relative to a plunger sleeve, the externally adjustable stop including a stop collar that threadably engages the sleeve (or the handle rod) and presents a mechanical abutment engageable by a cooperating abutment fixed to the handle rod (or sleeve). Further, the rotation of the stop collar changes the axial position of the mechanical abutment and thereby selects a repeatable plunger stroke length in at least three distinct settings without disassembling the apparatus.

Further, the stop collar includes discrete click-stops at 6 mm, 10 mm, and 14 mm head travel. Further, the stop collar is guarded by a shroud to prevent inadvertent movement during operation. Further, the visible indicia on the sleeve align with a pointer on the collar to indicate selected stroke length.

Further, the method comprises selecting a stroke setting by rotating the stop collar to a marked detent and thereafter performing repeated strokes to achieve a targeted extraction profile.

Further, in some embodiments, the end cap defines, within the cap interior space, a pre-dose reservoir sized to contain a measured quantity of beverage ingredients prior to brewing and a gate member movable between a closed position blocking a reservoir outlet and an open position to release the ingredients into the interior ingredient chamber after the apparatus is placed in a mug. Further, a user-accessible actuator on the exterior of the end cap is operatively coupled to the gate member to initiate ingredient release without removing the end cap.

Further, the gate member is a sliding shutter guided in tracks and biased closed by a spring. Further, the reservoir includes a perforated floor to permit pre-wetting in the cap interior space before gate opening. Further, the actuator includes a child-resistant push-and-twist mechanism.

Further, the method comprises loading beverage ingredients into the reservoir of the apparatus, placing the apparatus in a mug containing brewing fluid, opening the gate to drop the ingredients into the interior ingredient chamber, and then operating the plunger assembly to brew.

Further, in some embodiments, a forward face of the plunger head carries helical agitation fins extending radially from a central region toward a peripheral region, the fins being profiled to convert axial motion into swirl-inducing radial jets that drive cross-flow through the beverage ingredient bed and toward the side-wall filter portion during a downward stroke.

Further, the fins have a helix angle between 15° and 45°. Further, peripheral notches are formed adjacent to the interior wall to promote circumferential mixing. Further, the plunger head includes through-channels that meter flow to the fins.

Further, the method comprises stroking the finned head to induce rotational and radial flow through the ingredient bed so as to shorten brew time while maintaining extraction uniformity.

Further, in some embodiments, the end cap couples to the apparatus container by a bayonet interface comprising at least two lugs on one of the cap and container that engage corresponding J-shaped slots on the other to lock with less than one quarter-turn, and wherein a mechanical interlock prevents axial travel of the plunger head more than 3 mm unless the bayonet interface is in a fully locked position. Further, the mechanical interlock includes a blocking sleeve that retracts from the handle rod path only when a cam surface coupled to the bayonet reaches a locked detent.

Further, the interlock provides a tactile and audible confirmation upon full lock. Further, the blocking sleeve is spring-biased toward the blocking position. Further, the bayonet interface includes elastomeric seats to seal against leakage.

Further, the method comprises aligning and twisting the end cap of the apparatus to the locked condition, thereby enabling plunger operation, and then executing brewing strokes.

Further, in some embodiments, the apparatus comprises a depth-control clip attached to the end cap and adjustable to engage an upper rim of a receiving mug, the clip defining a stop surface that sets a repeatable immersion depth of the apparatus container within the mug when the clip contacts the rim. Further, the clip includes a hinged arm movable from (i) a rim-engaging position to (ii) a deployed stand position in which the hinged arm cooperates with the end cap to form a freestanding support that holds the apparatus container above a countertop to drip dry after brewing.

Further, the clip has detented length adjustments for mugs of different heights. Further, the stand position forms a tripod with two feet molded in the end cap. Further, the elastomeric pads on the clip protect a mug rim from marring.

Further, the method comprises setting a desired immersion depth by adjusting and engaging the clip of the apparatus to a mug rim, brewing by stroking the plunger, and then deploying the clip as a stand to hold the wet apparatus container above a surface.

Further, in some embodiments, the side-wall exterior of the apparatus container is at least partially surrounded by a removable insulating sleeve that reduces heat transfer to a user's fingers during insertion and removal, and wherein the end cap carries a passive temperature indicator selected from a thermochromic window or a bimetallic pointer calibrated to change state when the brewing fluid adjacent the apparatus reaches a predetermined temperature or time-at-temperature threshold indicating brewing readiness.

Further, the insulating sleeve is double-walled with an air gap and provides finger grooves. Further, the thermochromic window is visually exposed through a lens and labeled with "ready" and "too hot" regions. Further, the bimetallic pointer is mechanically coupled to a fin that extends into the cap interior space.

Further, the method comprises brewing with the apparatus while monitoring the passive indicator and removing the apparatus from the mug when the indicator signals readiness, using the insulating sleeve to grasp the apparatus.

Further, in some embodiments, the apparatus container includes a movable base assembly that seals the bottom of the interior ingredient chamber during brewing and that is selectively openable after brewing to discharge spent ingredients, the movable base assembly comprising:

A base door movable between a closed, sealed position and an open position providing an ejection opening; and A scraper/ejector member is disposed within the interior ingredient chamber and operably coupled to a user actuator so that movement of the actuator toward the base door in the open position drives the scraper/ejector member through the chamber to compact and expel spent ingredients through the ejection opening.

Further, the base door includes a latch accessible from the exterior and a circumferential seal that engages the side wall in the closed position to prevent leakage during brewing.

Further, the base door is a hinged flap retained by a bayonet-style quarter-turn latch. Further, the scraper/ejector member is a ring closely conforming to the interior ingredient chamber wall and connected to the plunger rod by a quick-disconnect linkage. Further, the actuator is the plunger handle itself when the base door is open, so that a short stroke ejects the spent puck.

Further, after brewing with the apparatus, the method comprises moving the base door to the open position, actuating the scraper/ejector member to push spent ingredients out through the ejection opening, and rinsing with minimal disassembly.

In some embodiments, the apparatus may include a dual-wall configuration with relative motion between a first side wall and a second coaxially disposed side wall, wherein the degree of overlap of openings between the two walls may be varied to dynamically control fluid flow. The technical problem addressed here is the lack of fine-grained control over steeping and infusion rates in conventional brewers. By enabling relative rotation or translation of walls to adjust effective open area, the apparatus may improve beverage extraction uniformity and adaptability to different ingredient particle sizes. In different implementations, the indexing mechanism may be mechanical (ratchet-based), magnetic detent-based, or electronically actuated using micro-servos, improving fluid dynamics technology in beverage brewing systems.

In some embodiments, the plunger assembly may include a plunger head with a skirting element that selectively engages or disengages with the side wall during upward and downward motions. The problem addressed is the inefficiency of traditional plungers that allow bypass flow or incomplete sealing. The skirting element may create a radial seal only during downward strokes, reducing resistance during upward strokes and thereby improving energy efficiency and user comfort. Implementation may involve elastomeric skirts, retractable spring-loaded seals, or memory-shape polymer skirts, improving sealing technology in pressure-driven brewing devices.

In some embodiments, the plunger head may include one or more blades coupled via mounting elements to provide controlled agitation of the brewing fluid. The problem solved here is the uneven distribution of solutes and inadequate turbulence in static brewing systems. The blades may rotate, oscillate, or simply disturb the flow during axial motion of the plunger, enhancing extraction kinetics. In some cases, the blades may be retractable to minimize obstruction during cleaning, improving mixing and turbulence-inducing technology within beverage infusion apparatuses.

In some embodiments, the apparatus may include a flow control mechanism with a one-way valve integrated into the container side wall or base cap. The problem solved is the uncontrolled bidirectional flow that leads to over-extraction or weak infusion. The one-way valve may allow outward but not inward flow (or vice versa) to control pressure equalization and directional circulation, which may be achieved with duckbill valves, reed valves, or diaphragm-style valves, improving fluidic control technology in sealed brewing systems.

In some embodiments, the base cap may include an integrated receptacle for storage and timed release of additional beverage ingredients. The problem addressed is the inability to introduce fresh flavors or additives at precise stages of the brewing process. The receptacle may be spring-loaded, magnetically latched, or solenoid-controlled to release sweeteners, flavors, or secondary ingredients, improving ingredient dispensing technology integrated within beverage brewing containers.

In some embodiments, the plunger head may include retractable scraping elements to remove sediment accumulation along the interior side walls. The problem addressed is residue buildup that affects hygiene, taste, and subsequent brewing cycles. The scraping elements may extend or retract via manual buttons, cam mechanisms, or electrically actuated micro-motors, improving self-cleaning technology in brewing and infusion devices.

In some embodiments, the apparatus may include a modular base cap coupling via threaded or bayonet interfaces, enabling quick detachment for cleaning and maintenance. The technical problem addressed is user inconvenience in disassembling conventional brewing devices. By enabling quick-release coupling, the apparatus may reduce downtime and improve usability, improving modular coupling technology for food-safe containers.

In some embodiments, the apparatus may include a sensor array (pressure, temperature, turbidity, etc.) embedded in the side wall or plunger assembly. The problem solved is the lack of feedback in conventional manual brewing systems. The sensors may be configured to relay real-time brewing parameters to a smartphone application, thereby ensuring consistent results, improving sensor integration technology in consumer beverage appliances.

In some embodiments, the apparatus may include a microcontroller-based adaptive control system coupled to the flow control mechanism and receptacle actuator. The problem addressed is the inability of traditional systems to adapt infusion dynamics dynamically. By automatically adjusting flow resistance, valve timing, or ingredient release based on sensor feedback, the brewing cycle may be optimized, improving embedded control technology for beverage preparation systems.

In some embodiments, the plunger assembly may include energy-harvesting components, such as piezoelectric or electromagnetic transducers, configured to convert user-applied plunger force into electrical energy. The problem solved is the lack of energy sources for powering sensors or actuators in portable brewing systems. Harvested energy may be stored in supercapacitors or rechargeable micro-batteries, improving self-powered energy harvesting technology for handheld consumer devices.

In some embodiments, the apparatus may include antimicrobial and non-stick surface coatings applied to interior contact regions. The problem addressed is microbial growth and fouling common in beverage residue environments. Coatings may include silver nanoparticle composites, hydrophobic fluoropolymer layers, or photocatalytic $TiO_2$, improving surface material technology for hygiene and durability in beverage systems.

In some embodiments, the apparatus may include an AI-driven companion application that learns user preferences over time and recommends infusion timings, ingredient additions, and agitation patterns. The problem solved is the lack of personalization in current brewing systems. The application may utilize reinforcement learning based on historical brewing outcomes, improving human-machine interface technology in beverage preparation ecosystems.

The apparatus is designed for use within an external container that holds liquid during brewing, such as a mug, cup, tumbler, carafe, travel flask, bottle, or pitcher formed from glass, stainless steel, ceramic, or food-grade polymers like polypropylene, Tritan, polycarbonate, or nylon. The brewing fluid is a water-based liquid employed to extract solubles from beverage ingredients and may be hot water between about 80-100° C. for coffee or tea, room-temperature or chilled water between about 0-20° C. for cold brew, and may optionally include milk or milk alternatives. Beverage ingredients include ground coffee with particle sizes spanning about 200-1200 μm, tea leaves, herbal blends, cocoa nibs, botanicals, powdered flavors, or soluble granules. An "open state" of an opening refers to a condition in which the flow path is substantially unobstructed and allows liquid passage with minimal resistance, whereas a "closed state" refers to a condition in which the path is blocked or sealed such that flow is substantially prevented, for example at or below approximately 5 mL/min under a 10 kPa differential; such states may be realized by caps, shutters, valves, or seals. The "effective open area" refers to the cumulative area available for liquid passage through overlapped openings of two members such as a side wall and a sleeve-computed as the sum of geometric overlaps normal to the wall thickness and adjustable by changing their relative positions. A "disengaged state" of a flow-control element indicates that the element is retracted or aligned to allow freer flow through the wall openings, whereas an "engaged state" indicates that the element covers or occludes the openings to restrict flow. One-way valves suitable for the apparatus include silicone duckbill, umbrella, flapper-type checks, and spring-biased poppets having typical cracking pressures of about 0.5-10 kPa. Non-limiting materials for structural components include stainless steels, anodized aluminum, polymers such as PP, POM, PET, PC, PEEK, and PEI, and elastomers such as silicone, TPE, and EPDM for skirts, seals, and valves; filters may be woven or sintered media rated about 100-800 μm. Non-limiting manufacturing approaches include injection molding, machining, deep drawing, stamping, laser cutting of apertures, overmolding of elastomers, ultrasonic welding, adhesive bonding, threaded or bayonet couplings, detents, and press fits. Illustrative dimensions that enable construction include an inner diameter of a cylindrical container of about 35-60 mm, a height of about 80-160 mm, perforation diameters of about 0.3-2.0 mm or slot widths of about 0.2-1.0 mm, mesh ratings of about 100-800 μm, and radial clearances between mating cylindrical members generally within about 0.05-1.5 mm as specified below.

The core apparatus includes an apparatus container and a plunger assembly. The apparatus container has a side wall extending from a top end to a bottom end and defining an interior space for the beverage ingredient. The bottom end defines a bottom opening that is selectively placed in open or closed states by a base cap. With the base cap in the closed state, at least one portion of the side wall provides a plurality of openings to enable liquid communication between the interior space and the external container so that the brewing fluid can move into and out of the interior space during steeping. The side wall is preferably cylindrical but may be prismatic, frustoconical, or slightly tapered to ease manufacture, and may have a thickness of about 0.6-2.5 mm for polymer versions or about 0.2-1.0 mm for metal versions. The plurality of openings may be round perforations sized about 0.3-1.2 mm for coffee and about 0.6-1.8 mm for large-leaf tea, elongated slots about 0.2-0.8 mm in width, or integrated mesh windows; open-area ratios can range from roughly 5-60% of the lateral wall area. The base cap can be threaded, bayonet-engaged, or snap-fit, and is sealed with an O-ring or flat gasket to place the bottom opening reliably in the closed state during brewing and in at least one open state during cleaning or access. When placed inside the external container with the base cap closed, brewing fluid flows laterally through the wall openings to wet the ingredient and returns through other openings to maintain immersion brewing in the external container. The plunger assembly is coupled to the top end and includes a handle and a head; it translates the head within the interior space in response to user-applied force, typically over about 10-120 mm of stroke and about 0.5-15 N of force, to mix, gently compress, or otherwise manage internal flow and extraction. The top end may include a guide bushing or ribs, and the plunger rod may be keyed for alignment.

In one embodiment, a first side wall in the form of a sleeve is disposed in contact with the main side wall and is movably coupled by a wall-coupling element so that openings in the sleeve can be overlapped with openings in the main wall to define an effective open area adjustable across multiple relative positions. The sleeve may be inside or outside the main wall with a radial clearance on the order of 0.05-0.20 mm to limit bypass. The coupling may be rotational, translational, or hybrid and can be implemented with journals, snap detents, pin-in-slot or helical cam guides, and low-friction interfaces. The pattern of sleeve openings may replicate the pitch of the main wall or present larger window apertures to reduce clogging; the geometry may be devised so that the effective open area varies linearly or stepwise as the sleeve is moved.

To further articulate the overlap mechanism, the main side wall includes solid wall regions between adjacent openings, and the sleeve includes first wall regions between adjacent sleeve openings. As the sleeve transitions among positions, the first wall regions partially or fully occlude the main wall openings so that the effective open area is reduced at minimal settings and increased at maximal settings. The arrangement can be dimensioned and toleranced so that the effective open area adjusts over a range such as approximately 5-60% of the maximum geometric open area with per-position changes on the order of 5-20%, and an optional thin elastomer ring at an end of the sleeve may limit tangential bypass when the system is nearly closed.

In a cylindrical implementation, both the main wall and the sleeve are coaxial cylinders, and the sleeve rotates relative to the main wall to change the overlap. Rotation hardware may include a knurled band, a click spring, and a recess pattern for tactile detents, and thrust washers to prevent binding, with a preferred user torque feel in the range of about 2-6 N·cm. The sleeve can include an indexing element such as a pointer, engraved line, or window that cooperates with markings such as numbers or text on the main wall to indicate discrete positions, and the detents may be aligned with the markings to ensure repeatable settings that correspond to specific effective open areas.

For a cylindrical side wall, the plunger head can be a circular plate whose outer edge is radially spaced inward from the inner wall surface by a gap, such as about 0.25-1.5 mm, so that the plate moves freely without scraping and allows controlled bypass when no sealing skirt is present. The plate thickness can be about 1-4 mm, the diameter undersized by about 0.5-2.0 mm relative to the inner diameter, and the plate can be guided by a central rod in the top bushing or by edge pads sliding along axial ribs.

A skirting element may be provided around the plate perimeter to establish directional sealing behavior. The skirt can be an elastomeric lip seated in a circumferential groove with a lip angle of about 20-45° and a hardness of around 40-60 Shore A silicone. During the downward stroke, internal pressure and lip geometry urge the skirt outward to form a radial seal against the inner wall with an interference of about 0.1-0.5 mm and a contact length of about 1-3 mm so that displaced liquid is driven laterally through the side-wall openings; during the upward stroke, the lip relaxes inward to reduce suction and allow liquid to pass the plate with less drag, thereby promoting gentle re-immersion and mixing.

The plunger head can carry a mounting element that supports at least one movable blade so that, in addition to the axial motion of the head, the blade produces targeted agitation. The mounting element may be a boss, clevis, or dovetail track, and the blade may be a thin fin or paddle about 0.5-2 mm thick and 5-20 mm long that pivots on a pin, slides in a guided track, or flexes elastically under flow. In a further version, two or more blades are coupled to the head to agitate the brewing fluid during motion, optionally with a helical twist of about 10-30° or with bleed holes of about 1-3 mm diameter to temper shear so that stratification is broken and extraction uniformity is improved without promoting fines migration.

A flow-control mechanism can be coupled with the apparatus container to modulate the movement of brewing fluid through the wall openings. The mechanism includes a flow-control element and a flow-control actuator that transitions the element between engaged and disengaged states. Structurally, the element may be a sliding or rotating band that covers perforation zones, an interior shutter wall, a flexible membrane with ports that align or misalign, a set of valve units mounted over perforation clusters, or a filter cartridge that can be pressed against the wall to reduce effective pore size. The actuator may be a rotational ring driving a cam linkage, a linear slider guided in a track, a push-button that operates a lever, or a lever or cable accessible through a travel lid. In the disengaged state, fluid movement through the openings is allowed; in the engaged state, it is restricted, for example, by reducing the effective open area to at most about 10% of maximum, while the disengaged state may provide at least about 80% of maximum area. Indicators such as color fields, tactile stops, or positive detents can make state transitions repeatable and unambiguous.

In one version of the flow-control mechanism, the flow-control element is or includes one-way valves so that in the engaged state, outward movement of liquid from the interior to the container is permitted while inward movement is inhibited. The valves can be mounted directly over perforations as duckbills or umbrellas press-fit into apertures, as flapper discs retained by a cage, or as poppets in threaded bosses, oriented to open when interior pressure exceeds exterior pressure by the valve's cracking pressure. This behavior enables purge during compression while limiting reentry of external fluid or fines.

The base cap may also incorporate a one-way valve. With the bottom opening closed by the cap, the valve admits brewing fluid from the container into the interior space during the upward motion of the plunger head and restricts movement from the interior space to the container during the downward motion. An umbrella valve seated over a cap port, a spring-biased poppet, or a duckbill mounted in a molded boss may be used. On the upstroke, the pressure inside the interior space drops, and the valve opens toward the interior so external fluid enters through the cap; on the downstroke, the valve closes so that displaced fluid is driven out through the side-wall openings rather than through the cap, promoting lateral rinsing while the cap seal maintains the bottom opening closed.

The flow-control element may take the form of a wall, a membrane, a sleeve, a valve, or a filter, alone or in combination. For example, a sliding shutter plate guided by rails can cover perforation zones; an elastomer membrane with patterned ports can stretch or align to alter flow; the adjustable sleeve discussed above can be used as the element; discrete one-way or two-way valves can be placed over openings; and a mesh layer, such as 100-200 μm, can be brought into contact with the wall to reduce effective pore size when clarity is desired. The corresponding actuator includes an actuator element and a mechanism that transitions between a first actuator state corresponding to engaged and a second actuator state corresponding to disengaged in response to user action; mechanisms may include cam-and-follower systems driven by a button, rack-and-pinion systems driven by a ring, or detented sliders, with springs optionally biasing the default state.

The base cap can further include a receptacle on its interior surface defining a receptacle interior space and a receptacle opening, together with a receptacle lid that transitions the opening between open and closed states so that an additional beverage ingredient is retained in the closed state and released into the interior space in the open state. The receptacle may be a cup-shaped pocket of about 0.5-10 mL that faces the interior space, and the lid may be a hinged flap with a latch, a rotating disk with a window, a sliding shutter, or a peelable foil for single-use capsules, sealed with an elastomer gasket. A receptacle actuator can be provided with an actuator element and mechanism that transitions between first and second actuator states mapping to the receptacle's open and closed states; examples include push-to-open latches, cams that index a shutter, and sliders or pull-tabs accessible near the top rim, with optional child-resistant latches or temperature-responsive interlocks to govern release.

The plunger head may include a scraping element that resides in a radial cavity around the circular plate and shifts between an extended position in which it radially engages the inner surface of the side wall and a retracted position in which it withdraws into the cavity. The scraping element can be a continuous or segmented ring of silicone, TPU, or UHMWPE with a chamfered or radiused contact edge sized to project about 0.2-0.8 mm when extended and to sit flush or below flush when retracted. Extension can occur passively as a function of pressure during the downstroke, actively via a small lever that actuates a cam on the handle, or responsively using a thermally actuated element that extends at elevated temperatures; in each case, the scraping action helps remove fines from the wall, reduces clogging, and improves cleaning.

An independent embodiment integrates the core apparatus with the adjustable sleeve. The apparatus container includes the base cap, the side wall with openings, and the bottom opening that the base cap closes for brewing; the first side wall in the form of a sleeve is movably coupled by a coupling element and includes first openings aligned to overlap the main openings as the sleeve transitions among multiple positions to vary the effective open area through which brewing fluid moves. The plunger assembly at the top end moves the plunger head within the interior space. A rotary sleeve with detents and a pointer-scale may provide discrete overlap steps that produce predictable changes in flow, or an axially translating sleeve may provide fine control for cold brew or tea. For enablement, the specification can correlate index settings, effective open area, and nominal flow at a defined pressure differential with illustrative values.

Another independent embodiment integrates the core apparatus with a flow-control mechanism comprising a flow-control element and a flow-control actuator that transitions between engaged and disengaged states to modulate movement of the brewing fluid through the wall openings. One version uses an inner shutter driven by a top slider to switch between free steeping and restricted-flow modes; another uses umbrella valves mounted over perforation banks and a ring that compresses the valves against seats in the engaged state. A representative method of use includes loading ingredient, closing the base cap, placing the apparatus in the container, adding brewing fluid, setting the sleeve or flow-control condition, moving the plunger to agitate or separate, optionally releasing an additional ingredient from the base-cap receptacle, and removing and cleaning the apparatus by opening the base cap and rinsing while the scraper assists debris removal.

To further enable practice, the specification may provide guidance on guides and tolerances—such as a plunger-rod bushing clearance of about 0.05-0.25 mm and sleeve axial float of at most about 0.3 mm—on seals and elastomer properties—such as an O-ring squeeze of about 20-30%, skirt hardness of about 40-60 A, and valve cracking pressure of about 0.5-3 kPa for gentle operation—and on filtration choices—such as meshes of about 200-400 μm or perforations of about 0.3-0.6 mm for coffee, and meshes of about 400-800 μm or perforations of about 0.6-1.2 mm for tea. The components and materials may be selected to meet applicable food-contact standards and to withstand exposure to liquids between about 0-100° C.

In some embodiments, the apparatus implements a coordinated flow-regulation architecture in which a directional skirting element on a plunger head, an adjustable first side wall that sets an effective open area, and at least one one-way valve in a base cap are tuned as a system to establish a repeatable, stroke-synchronized circulation path during reciprocation. In one example, the adjustable first side wall is indexed to provide a higher effective open area in an upper band of a side wall and a lower effective open area in a lower band of the side wall, while the base-cap valve is oriented to admit brewing fluid only during an upward motion of the plunger head. This arrangement produces a net upward bulk flow within an interior space during the upward motion and a lateral outflow through the upper band of openings during the downward motion, thereby suppressing stratification and retaining fines. In certain implementations, a ratio of upper-band to lower-band effective open area is between about 1.6:1 and about 3.2:1, and a radial interference of the skirting element is between about 0.15 mm and about 0.35 mm, yielding a measurable reduction in turbidity at fixed grind and brew time relative to a uniform-porosity wall.

In some embodiments, a quasi-random perforation pattern is formed in a side wall and paired with a deterministic window pattern in the adjustable first side wall. The side wall may include a Poisson-disk distribution of apertures having a controlled minimum spacing and locally varying diameters, while the adjustable first side wall carries arc-shaped windows whose angular widths increase with height. As the adjustable first side wall transitions among indexed positions, overlap between apertures and windows produces a spatially non-uniform but repeatable effective open-area field that disrupts preferential channels and edge currents. In certain versions, a standard deviation of local effective open area measured over tiles of about 10 mm by about 10 mm is maintained between about 8% and about 18% at a mid-range index to reduce channeling without inducing localized clogging.

In some embodiments, the plunger head incorporates helical vanes that function as an internal flow inductor to generate swirl synchronized with stroke direction. A handedness and lead of the vanes are selected so that, in cooperation with the directional skirting element, the apparatus induces swirl during the downward motion and attenuates swirl during the upward motion, or vice versa. In one implementation, a vane lead is between about 0.7 and about 1.4 times an internal diameter of the apparatus container, and a vane height is between about 10% and about 20% of a plunger head radius, thereby establishing a stable vortex that distributes fines radially without entraining fines through the side wall.

In some embodiments, the adjustable first side wall is equipped with a micro-detent encoder that provides discrete tactile and/or acoustic signatures mapped to quantitative effective open-area values. An asymmetric tooth ring formed on the adjustable first side wall cooperates with a spring arm formed on the side wall to emit a unique click pattern for each index position, enabling blind confirmation of a selected setting when the apparatus is used inside an opaque container. Tooth geometry and spring stiffness are selected so that energy released per detent event remains below a threshold (e.g., less than about 0.02 J) to avoid dislodging fines while still signaling the setting.

In some embodiments, a scraping element of the plunger head is actively position-controlled by a cam track integrated into a plunger rod. The cam track includes one or more lobes that extend the scraping element during a terminal portion of a downward motion, for example, a final 10% to 25% of travel, to wipe an inner surface of the side wall after extraction is substantially complete, and retract the scraping element during the remainder of a reciprocation cycle to minimize drag and disturbance. A lobe rise may be between about 0.25 mm and about 0.6 mm timed to the last about 12 mm to about 20 mm of travel.

In some embodiments, a dual-porosity wall construction is provided in which a lower region of the side wall includes a finer filtration layer and an upper region includes a coarser filtration layer. For example, a lower third of the side wall may incorporate a co-molded or bonded mesh rated between about 150 μm and about 250 μm, while an upper two-thirds incorporates a mesh rated between about 350 μm and about 600 μm. Windows of the adjustable first side wall are sized so that at lower effective open-area settings, a larger portion of the coarser region is exposed to maintain flow, and at higher effective open-area settings, a larger portion of the finer region is exposed to limit fines passage. A junction between regions may be located at least about 10 mm above the base cap to avoid short-circuit flow.

In some embodiments, the base cap includes a primary one-way valve having a first cracking pressure and a micro-check relief valve having a second, higher cracking pressure. The primary one-way valve may crack between about 0.5 kPa and about 3 kPa to admit liquid during an upward motion of the plunger head, whereas the micro-check relief valve may crack between about 6 kPa and about 10 kPa to vent small volumes through a labyrinth to the exterior of the apparatus container during transient pressure spikes. The combination of a low-cracking intake path and a higher-cracking relief path stabilizes user effort and reduces splashing without permitting solids ingress.

In some embodiments, a receptacle lid is thermally responsive so that an additional beverage ingredient is released at a controlled liquid temperature. The receptacle lid may incorporate a calibrated bimetal snap-disk configured to invert at a target temperature and mechanically release the receptacle opening. In one example, the snap-disk opens at about 70° C. to about 80° C. to release aromatics after an initial steep, or at about 35° C. to about 45° C. to release sweeteners near serving temperature. Disk diameter, dome height, and alloy selection are chosen to couple the actuation temperature to an interior space via a thermally conductive path.

In some embodiments, a captured anti-backdrive ramp prevents inadvertent adjustment of the adjustable first side wall during plunging or transport. A sawtooth ramp formed on the side wall cooperates with a pawl formed on the adjustable first side wall so that rotation proceeds in forward increments unless the pawl is lifted by a secondary control ring. Angular increment per index may be about 12°, and pawl lift height may be about 1.2 mm to about 2.0 mm, thereby tying geometric parameters to the evolution of effective open area while resisting accidental rotation.

In some embodiments, a removable diffuser disk is disposed above an ingredient bed within the interior space to spread flow during a downward motion of the plunger head. The diffuser disk may have a porosity between about 20% and about 35% and is biased to float at a gap between about 3 mm and about 8 mm above the bed. During the downward motion, the directional skirting element seals, and displaced liquid is forced radially outward through the diffuser before exiting through the side wall, thereby reducing localized compression and mitigating channeling.

In some embodiments, the flow-control element is actuated through a sealed wall by a magnetic coupling to enable adjustment while a top opening of the external container is covered. An internal ferromagnetic slider attached to a shutter is driven by an external magnetic ring embedded in a collar at the top region of the apparatus container. A coupling force is selected to exceed expected frictional loads by a margin, for example, about 1.5 times, while permitting decoupling under abnormal loads to protect internal components. This sealed actuation avoids through-wall mechanical penetrations and supports hygienic operation.

In some embodiments, index positions of the adjustable first side wall are calibrated to measured hydraulic and extraction outcomes. For a defined pressure differential, index positions may correspond to effective open areas of approximately 20 mm$^2$, 60 mm$^2$, 100 mm$^2$, 140 mm$^2$, and 180 mm$^2$, and nominal flows of approximately 1.5 mL/s, 3.8 mL/s, 6.0 mL/s, 7.6 mL/s, and 8.4 mL/s, respectively. At a fixed recipe, these settings may correspond to separated total dissolved solids windows that differ by at least about 0.2 percentage points. The mapping of structural settings to quantitative performance proxies enables repeatable selection of brewing outcomes.

In some embodiments, the apparatus further includes a flow-control mechanism coupled to the apparatus container. The flow-control mechanism comprises a flow-control element and a flow-control actuator. The flow-control actuator is configured to transition the flow-control element between an engaged state and a disengaged state. The flow-control element is configured, in the engaged state, to cover or occlude at least a portion of the plurality of openings of the side wall to restrict liquid flow, and, in the disengaged state, to uncover or align with the openings to allow liquid flow, thereby modulating movement of the brewing fluid between the external container and the interior space through at least one of the openings. As used here, "engaged state" means the element is positioned to reduce effective open area and increase flow resistance (for example, to ≤about 10% of the maximum effective open area at a given axial band), and "disengaged state" means the element is positioned to increase effective open area and reduce flow resistance (for example, to >about 80% of the maximum). Non-limiting examples of the flow-control element include a sliding or rotating sleeve band that physically overlaps perforation zones; an interior shutter wall carried on rails that translates to cover perforation rows; a flexible membrane or film with ports that align/misalign with wall apertures; a set of discrete valve cartridges (e.g., umbrella or duckbill valves) mounted over clusters of openings; or a filter cartridge (e.g., 100-300 μm mesh) that can be pressed against the wall to temporarily reduce pore size. Non-limiting examples of the actuator include a manual ring coupled by a cam or rack-and-pinion to slide the sleeve, a linear thumb slider operating in a molded slot with detents, a push button that pivots a lever to press a membrane against the wall, or a magnetic coupling that moves an internal shutter via an external magnet for sealed adjustment. Materials suitable for the flow-control element include stainless steel for sleeves and shutters, polycarbonate or polypropylene for molded bands, and silicone for membranes and valves; actuator components may be molded acetal or nylon with stainless pins and springs. Suitable dimensions include sleeve rotational increments of about 10-30 degrees per index, shutter travel of about 2-8 mm, and membrane thickness of about 0.5-1.5 mm. In operation, the user sets the actuator to the disengaged state for free steeping and to the engaged state to restrict inflow/outflow during plunging or transport, with visual or tactile indicators confirming the state. This disclosure provides a corresponding structure for every "configured to" function, enabling a person of ordinary skill to make and use the flow-control mechanism without undue experimentation.

In some embodiments, the flow-control actuator includes an actuator element and at least one actuator mechanism configured to transition between a first actuator state and a second actuator state in response to user action on the actuator element. The engaged state of the flow-control element corresponds to the first actuator state, and the disengaged state corresponds to the second actuator state. As used here, an "actuator element" is a user-touchable part such as a ring, slider, lever, or button; an "actuator mechanism" is a linkage or converter that transforms user motion into element motion. Non-limiting actuator mechanisms include a cam-and-follower that pushes a shutter toward the wall in the first state and releases it via a spring to the second state; a detented slider whose end stops define the first/second states and whose linkage translates the sliding motion into rotation or translation of the sleeve; a rack-and-pinion converting ring rotation into axial band motion; and a toggle linkage with over-center spring establishing two stable states. Suitable design ranges include detent forces of about 2-8 N for positive feedback, travel distances of about 3-10 mm for sliders, ring rotation of about 45-120 degrees, and spring rates chosen so accidental bumps do not cause state change (e.g., threshold≥1.5× expected incidental loads). Visual markings (e.g., "OPEN/CLOSE") or tactile codes (e.g., different click counts) can be provided to confirm the state without requiring visual inspection.

In some embodiments, the apparatus further includes a receptacle actuator for a base-cap receptacle, the receptacle actuator comprising an actuator element and at least one actuator mechanism configured to transition between a first actuator state and a second actuator state in response to user action on the actuator element. The receptacle opening transitions between a receptacle open state and a receptacle closed state based on the transition of the actuator mechanism between the first and second actuator states, with the open state corresponding to the first actuator state and the closed state corresponding to the second actuator state. As used here, the "receptacle" is a cup-shaped or pocket-type cavity disposed on an interior surface of the base cap sized to hold an additional beverage ingredient (for example, 0.5-10 mL volume), and the "receptacle opening" is an aperture leading into the receptacle that is selectively blocked by a lid or shutter. Non-limiting actuator implementations include a push-to-open latch wherein pressing a top-accessible button drives a cam that unlatches a hinged lid; a rotary dial that indexes a shutter window into and out of alignment with the receptacle opening; a linear slide that retracts a gate to release contents; and a pull-tab or cord accessible near the top rim to trigger a linkage, enabling operation while the brewer remains in the external container. Suitable materials include polypropylene or polycarbonate for lids and shutters, silicone gaskets for sealing, and stainless pins for hinges. Suitable design ranges include lid gasket compression of about 15-30% to achieve liquid tightness while permitting repeated cycling, slider travel of about 5-12 mm, and latch forces of about 3-8 N to avoid accidental opening. In another variant, a thermally responsive bimetal snap-disk can be integrated into the actuator mechanism to automatically transition to the open state at a target liquid temperature (for example, about 70-80° C. for releasing aromatics, or about 35-45° C. for sweeteners), thereby demonstrating additional structural embodiments that perform the same function.

In some embodiments, the apparatus further includes a scraping actuator comprising an actuator element and at least one actuator mechanism configured to transition between a first actuator state and a second actuator state in response to user action on the actuator element. The scraping element transitions between an extended position and a retracted position based on the transition between the first and second actuator states, with the extended position corresponding to the first actuator state and the retracted position corresponding to the second actuator state. As used here, the "scraping element" is a continuous or segmented ring or blade disposed in a radial cavity around a circular plunger plate and sized to contact the inner surface of the side wall when extended (for example, radial projection of about 0.2-0.8 mm) and to clear the wall when retracted (for example, flush or negative clearance). Non-limiting scraping actuator mechanisms include a cam track integrated into the plunger rod with one or more lobes that drive a follower to project the scraper at a defined stroke phase (e.g., final 10-25% of the downstroke) and retract it otherwise; a miniature lever linked via a pin and slot to the scraper carrier for manual extend/retract; a micro-rack driven by a thumb wheel at the handle; and a thermally or magnetically actuated micro-solenoid in motorized versions. Suitable materials include silicone or TPU for elastomeric scrapers, UHMWPE for low-friction wiping rings, and acetal or stainless steel for cam and follower parts. Suitable design ranges include cam lobe rise of about 0.25-0.6 mm, follower spring rates that ensure positive retraction (e.g., 0.5-2.0 N/mm), and allowable drag forces in the extended state of about 0.2-1.0 N to avoid excessive user effort.

Figure 1:
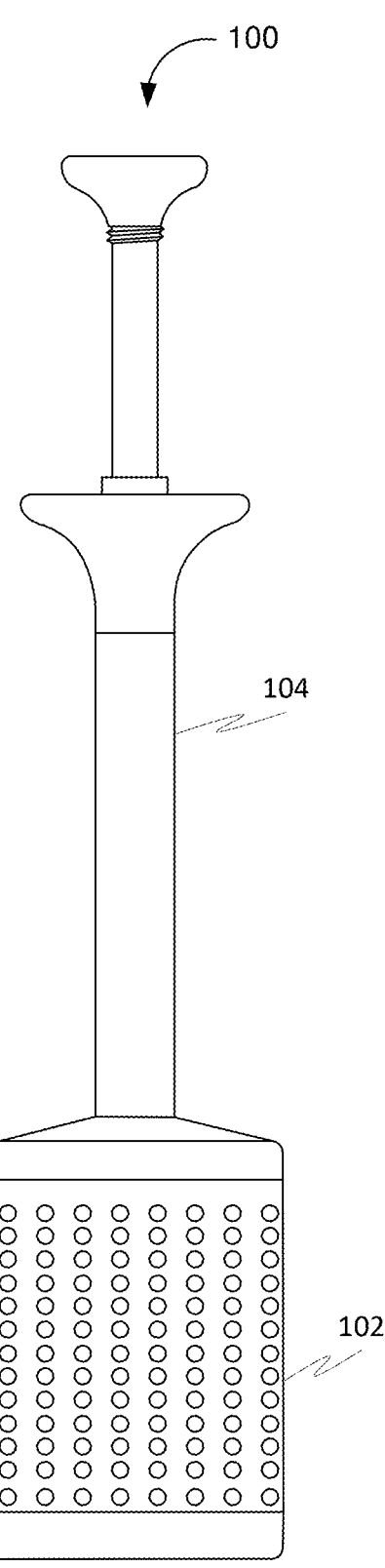
FIG. 1 is a front view of an apparatus 100 for facilitating brewing of beverages in a container 2302, in accordance with some embodiments.

FIG. 1 is a front view of an apparatus 100 for facilitating brewing of beverages in a container 2302, in accordance with some embodiments.

Figure 2:
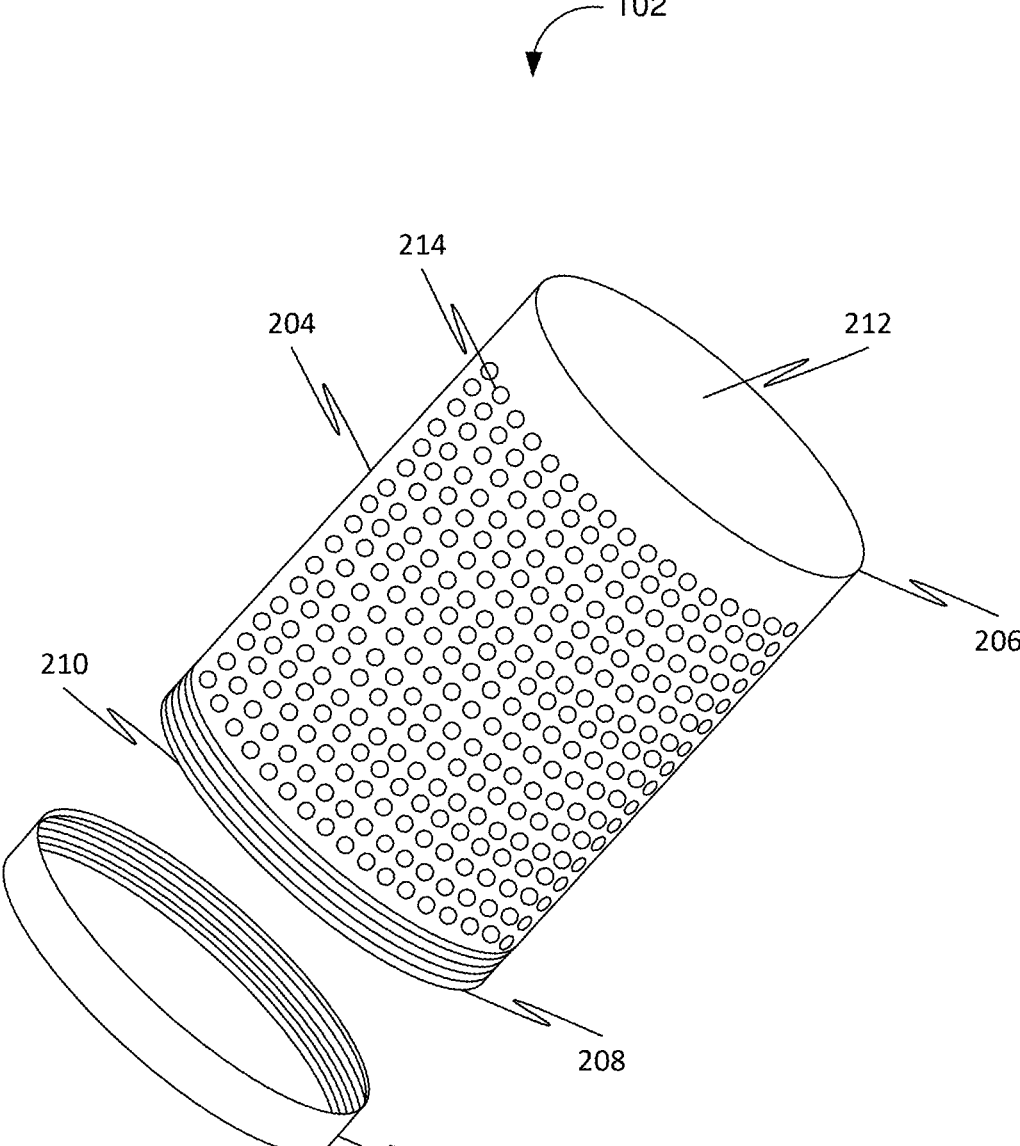
FIG. 2 is a perspective view of an apparatus container 102 of the apparatus 100, in accordance with some embodiments.

FIG. 2 is a perspective view of an apparatus container 102 of the apparatus 100, in accordance with some embodiments.

Figure 3:
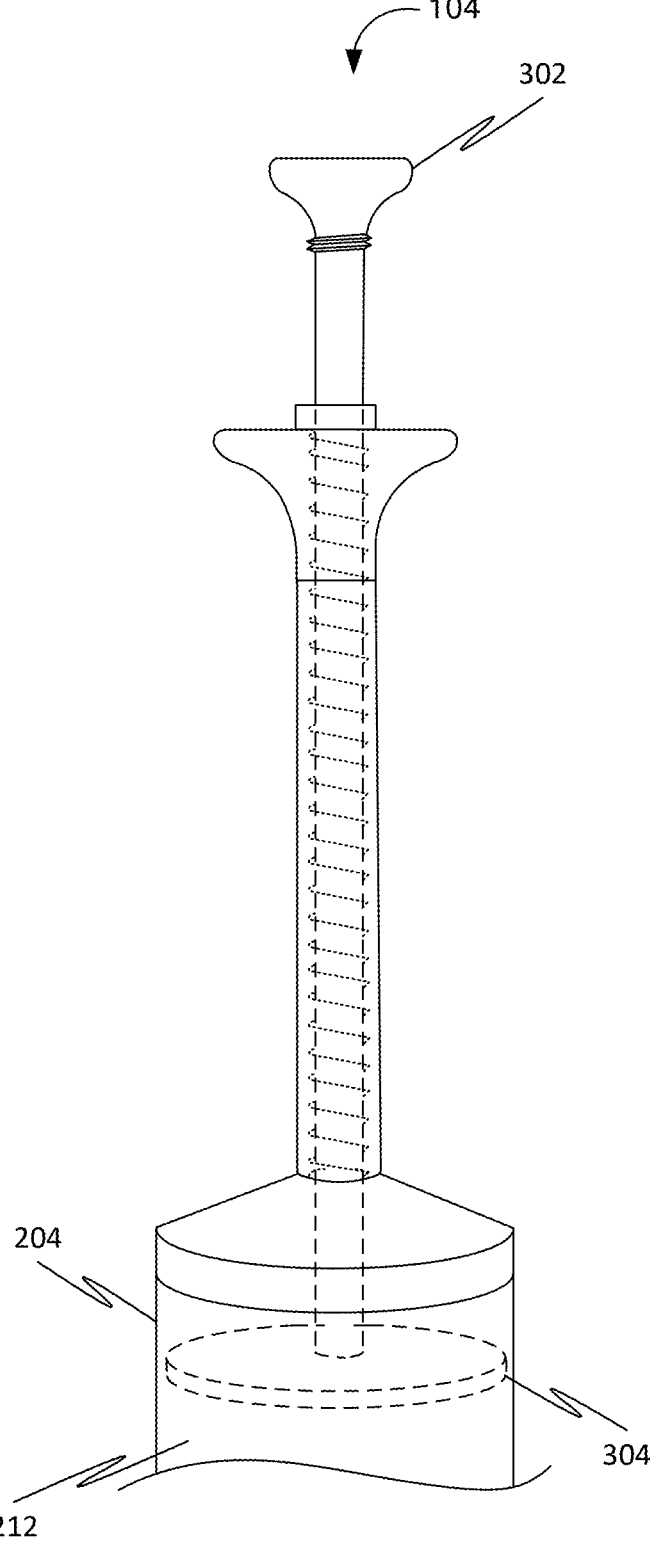
FIG. 3 is a perspective view of a plunger assembly 104 of the apparatus 100, in accordance with some embodiments.

FIG. 3 is a perspective view of a plunger assembly 104 of the apparatus 100, in accordance with some embodiments.

Accordingly, the apparatus 100 may include the apparatus container 102 comprising a base cap 202 and a side wall 204. Further, the side wall 204 extends between a top end 206 and a bottom end 208. Further, the side wall 204 defines an interior space 212 extending between the top end 206 and the bottom end 208. Further, the bottom end 208 defines a bottom opening 210 of the apparatus container 102. Further, the base cap 202 may be configured for transitioning the bottom opening 210 between one or more open states and a closed state. Further, at least one portion of the side wall 204 includes two or more openings 214. Further, the at least one portion of the side wall 204 may include a filter portion, a filter, a stainless steel filter, etc. Further, the apparatus container 102 may be configured to be disposed in the container 2302 with the bottom opening 210 in the closed state for brewing one or more beverages in the container 2302. Further, one or more brewing fluids disposed in the container 2302 move between the container 2302 and the interior space 212 through one or more of the two or more openings 214. Further, the apparatus container 102 may be configured for receiving one or more beverage ingredients in the interior space 212. Further, the apparatus 100 may include the plunger assembly 104 coupled to the top end 206 of the side wall 204. Further, the plunger assembly 104 includes a plunger handle 302 and a plunger head 304. Further, the plunger assembly 104 may be configured for moving the plunger head 304 in the interior space 212 based on one or more forces applied to the plunger handle 302. Further, the brewing of the one or more beverages may be further based on the moving of the plunger head 304 in the interior space 212 of the apparatus container 102. Further, the one or more forces applied to the plunger head 304 may be based on one or more pressing actions applied by a user on the plunger assembly 104. Further, the plunger head 304 moves by the application of the one or more pressing actions.

FIG. 4 is a perspective view of the apparatus container 102 of the apparatus 100, including a first side wall 402 contactingly disposed with the side wall 204 in a first relative position, in accordance with some embodiments.

In some embodiments, the apparatus container 102 includes the first side wall 402 contactingly disposed with the side wall 204. Further, the contactingly disposed may include slidingly disposed, rotatably disposed, engagementently disposed, interfacingly disposed, etc. Further, the side wall 204 and the first side wall 402 may be movably coupled using a wall coupling element 404. Further, at least one first portion of the first side wall 402 includes two or more first openings 406. Further, the first side wall 402 may be configured to be transitionable between two or more relative positions in relation to the side wall 204 for varying a degree of overlap of the two or more openings 214 with the two or more first openings 406. Further, the degree of overlap defines an effective open area of the two or more openings 214. Further, the one or more brewing fluids move between the container 2302 and the interior space 212 through the effective open area of one or more of the two or more openings 214.

FIG. 5 is a perspective view of the apparatus container 102 of the apparatus 100, including the first side wall 402 contactingly disposed with the side wall 204 in a second relative position, in accordance with some embodiments.

In some embodiments, the side wall 204 includes one or more wall regions 602 disposed between two or more adjacent openings of the two or more openings 214. Further, the first side wall 402 includes one or more first wall regions 604 disposed between two or more first adjacent openings of the two or more first openings 406. Further, the first side wall 402 may be further configured to be transitionable between the two or more relative positions in relation to the side wall 204 for varying a degree of occlusion of the two or more openings 214 by the one or more first wall regions 604. Further, the degree of occlusion of the two or more openings 214 further defines the effective open area of the two or more openings 214.

FIG. 6 is a perspective view of the apparatus container 102 of the apparatus 100, including the first side wall 402 contactingly disposed with the side wall 204 in a third relative position, in accordance with some embodiments.

In some embodiments, the side wall 204 and the first side wall 402 may be cylindrical. Further, the first side wall 402 may be coaxially disposed around the side wall 204. Further, the transitioning of the first side wall 402 between the two or more relative positions in relation to the side wall 204 includes rotating the first side wall 402 between the two or more relative positions in relation to the side wall 204.

FIG. 7 is a partial perspective view of the apparatus container 102 of the apparatus 100, including an indexing element 702, in accordance with some embodiments.

In some embodiments, the apparatus 100 may further include the indexing element 702, which may be configured for positioning the first side wall 402 at each of the two or more relative positions in relation to the side wall 204. Further, each of the two or more relative positions corresponds to a respective value of the effective open area of the two or more openings 214. Further, the indexing element 702 may be comprised in the first side wall 402. Further, the side wall 204 includes two or more markings 704. Further, the two or more markings 704 correspond to a respective one of the two or more relative positions. Further, the indexing element 702 may be alignable with each of the two or more markings 704 for the positioning of the first side wall 402 at each of the two or more relative positions.

FIG. 8 illustrates a perspective view of a plunger head 304 including a circular plate 802, in accordance with some embodiments.

In some embodiments, the side wall 204 includes a cylindrical side wall. Further, the plunger head 304 includes the circular plate 802. Further, an outer edge 804 of the circular plate 802 may be radially spaced inward from an inner surface 1608 of the side wall 204.

FIG. 9 illustrates a perspective view of the plunger head 304 including a skirting element 902, in accordance with some embodiments.

In some embodiments, the moving of the plunger head 304 includes a downward motion of the plunger head 304 in the interior space 212, and an upward motion of the plunger head 304 in the interior space 212. Further, the plunger assembly 104 further includes the skirting element 902 disposed around the outer edge 804 of the circular plate 802. Further, the skirting element 902 radially extends outward from the circular plate 802. Further, the skirting element 902 may be configured for radially engaging with the inner surface 1608 of the side wall 204 to form a radial seal with the inner surface 1608 in the downward motion. Further, the skirting element 902 may be configured for radially disengaging from the inner surface 1608 of the side wall 204 in the upward motion.

FIG. 10 illustrates a bottom perspective view of the plunger head 304 including one or more blades 1002, in accordance with some embodiments.

In some embodiments, the plunger head 304 includes one or more mounting elements 1004 and the one or more blades 1002. Further, the one or more blades 1002 may be movably coupled to the one or more mounting elements 1004. Further, the moving of the plunger head 304 includes moving the one or more blades 1002 in the interior space 212. Further, the one or more blades 1002 may include vanes, etc.

In some embodiments, the plunger assembly 104 includes one or more blades 1002 coupled to the plunger head 304. Further, the moving of the plunger head 304 includes moving the plunger head 304 and the one or more blades 1002 in the interior space 212. Further, the one or more blades 1002 may be configured for agitating at least a portion of the one or more brewing fluids comprised in the interior space 212. Further, the brewing of the one or more beverages in the container may be further based on the agitating.

FIG. 11 is a perspective view of the apparatus container 102 of the apparatus 100, including a flow control mechanism in a first engaged state, in accordance with some embodiments.

FIG. 12 is a perspective view of the apparatus container 102 of the apparatus 100, including the flow control mechanism in a second engaged state, in accordance with some embodiments.

FIG. 13 is a perspective view of the apparatus container 102 of the apparatus 100, including the flow control mechanism in a third engaged state, in accordance with some embodiments.

In some embodiments, the apparatus 100 may further include the flow control mechanism coupled with the apparatus container 102. Further, the flow control mechanism includes a flow control element 1102 and a flow control actuator 1104. Further, the flow control actuator 1104 may be configured for transitioning the flow control element 1102 between an engaged state and a disengaged state. Further, the flow control element 1102 may be configured for removably covering the two or more openings 214 based on the transitioning of the flow control element 1102 between the engaged state and the disengaged state for modulating a movement of the one or more brewing fluids between the container 2302 and the interior space 212 through one or more of the two or more openings 214.

In some embodiments, the modulating includes allowing a movement of the one or more brewing fluids between the container 2302 and the interior space 212 through one or more of the two or more openings 214 in the disengaged state, and restricting the movement of the one or more brewing fluids between the container 2302 and the interior space 212 through one or more of the two or more openings 214 in the engaged state.

In some embodiments, the flow control element 1102 includes one or more one-way valves. Further, the restricting of the movement of the one or more brewing fluids between the container 2302 and the interior space 212 through one or more of the two or more openings 214 in the engaged state includes allowing an outward movement of the one or more brewing fluids from the interior space 212 to the container 2302 through one or more of the two or more openings 214, and restricting an inward movement of the one or more brewing fluids from the container 2302 to the interior space 212 through one or more of the two or more openings 214 in the engaged state.

FIG. 14 is a front view of the apparatus 100 including one or more one-way valves 1402 in an open configuration during an upward motion of the plunger head 304 in an interior space 212, in accordance with some embodiments.

FIG. 15 is a front view of the apparatus 100 including the one or more one-way valves 1402 in a closed configuration during a downward motion of the plunger head 304 in the interior space 212, in accordance with some embodiments.

In some embodiments, the base cap 202 includes the one or more one-way valves 1402. Further, the moving of the plunger head 304 includes a downward motion of the plunger head 304 in the interior space 212, and an upward motion of the plunger head 304 in the interior space 212. Further, the base cap 202 may be configured for allowing a movement of the one or more brewing fluids from the container 2302 to the interior space 212 through the one or more one-way valves 1402 during the upward motion of the plunger head 304 based on the closed state of the bottom opening 210. Further, the base cap 202 may be further configured for restricting a movement of the one or more brewing fluids from the interior space 212 to the container 2302 through the one or more one-way valves 1402 during the downward motion of the plunger head 304 based on the closed state of the bottom opening 210.

In some embodiments, the covering the two or more openings 214 transitions the two or more openings 214 to a closed state. Further, the one or more brewing fluids do not move between the container 2302 and the interior space 212 through the two or more openings 214 based on the closed state of the two or more openings 214. Further, at least one of the upward motion and the downward motion of the plunger head 304 based on the closed state of the two or more openings 214 increases a pressure in the interior space 212 from an original level to one or more increased levels. Further, the brewing of the one or more beverages may be further based on the increase in the pressure. Further, the one or more brewing fluids may move from the container 2302 to the interior space 212 through the one or more one-way valves 1402. Further, the one or more one-way valves 1402 may be transitionable between a first state and a second state. Further, the one or more one-way valves 1402 allow the movement of the one or more brewing fluids from the container 2302 to the interior space 212, and restrict the movement of the one or more brewing fluids from the interior space 212 to the container 2302 through the one or more one-way valves 1402 in the first state. Further, the one or more one-way valves 1402 allow the movement of the one or more brewing fluids from the interior space 212 to the container 2302, and restrict the movement of the one or more brewing fluids from the container 2302 to the interior space 212 through the one or more one-way valves 1402 in the second state.

In some embodiments, the flow control element 1102 includes one or more of a wall, a membrane, a one-way flow membrane, a sleeve, a valve, and a filter.

In some embodiments, the flow control actuator 1104 includes an actuator element and one or more actuator mechanisms. Further, the one or more actuator mechanisms may be transitionable between a first actuator state and a second actuator state based on an action applied to the actuator element. Further, the transitioning of the flow control element 1102 between the engaged state and the disengaged state may be based on the transitioning between the first actuator state and the second actuator state. Further, the engaged state corresponds to the first actuator state, and the disengaged state corresponds to the second actuator state.

FIG. 16 is a partial front view of the apparatus 100 including a scraping element 1602 in a retracted position, in accordance with some embodiments.

In some embodiments, the plunger head 304 includes the scraping element 1602 coupled with the circular plate 802. Further, the scraping element 1602 radially extends outwards for radially interfacing with the inner surface 1608 of the side wall 204.

FIG. 17 is a front view of the apparatus 100 including the scraping element 1602 in an extended position, in accordance with some embodiments.

In some embodiments, the circular plate 802 includes a radial cavity 1604 around the circular plate 802. Further, the scraping element 1602 may be configured to be disposed in the radial cavity 1604. Further, the scraping element 1602 may be configured for transitioning between the extended position and the retracted position. Further, the scraping element 1602 radially extends outwards for the radially interfacing with the inner surface 1608 of the side wall 204 in the extended position. Further, the scraping element 1602 radially retracts in the radial cavity 1604 in the retracted position.

In some embodiments, the apparatus 100 may further include a scraping actuator 1606 comprising an actuator element and one or more actuator mechanisms. Further, the one or more actuator mechanisms may be transitionable between a first actuator state and a second actuator state based on an action applied to the actuator element. Further, the transitioning of the scraping element 1602 between the extended position and the retracted position may be based on the transitioning between the first actuator state and the second actuator state. Further, the extended position corresponds to the first actuator state, and the retracted position corresponds to the second actuator state.

FIG. 18 is a front view of an apparatus 1800 for facilitating brewing of beverages in a container, in accordance with some embodiments.

Further, the apparatus 1800 may include an apparatus container 1802 comprising a base cap and a side wall. Further, the side wall extends between a top end and a bottom end. Further, the side wall defines an interior space extending between the top end and the bottom end. Further, the bottom end defines a bottom opening of the apparatus container 1802. Further, the base cap may be configured for transitioning the bottom opening between one or more open states and a closed state. Further, at least one portion of the side wall includes two or more openings. Further, the apparatus container 1802 may be configured to be disposed in the container with the bottom opening in the closed state for brewing one or more beverages in the container. Further, one or more brewing fluids disposed in the container move between the container and the interior space through one or more of the two or more openings. Further, the apparatus container 1802 may be configured for receiving one or more beverage ingredients in the interior space. Further, the apparatus container 1802 includes a first side wall contactingly disposed with the side wall. Further, the side wall and the first side wall may be movably coupled using a wall coupling element. Further, at least one first portion of the first side wall includes two or more first openings. Further, the first side wall may be configured to be transitionable between two or more relative positions in relation to the side wall for varying a degree of overlap of the two or more openings with the two or more first openings. Further, the degree of overlap defines an effective open area of the two or more openings. Further, the one or more brewing fluids move between the container and the interior space through the effective open area of one or more of the two or more openings. Further, the apparatus 1800 may include a plunger assembly 1804 coupled to the top end of the side wall.

Further, the plunger assembly 1804 includes a plunger handle and a plunger head. Further, the plunger assembly 1804 may be configured for moving the plunger head in the interior space based on one or more forces applied to the plunger handle. Further, the brewing of the one or more beverages may be further based on the moving of the plunger head in the interior space of the apparatus container 1802.

FIG. 19 is a front view of an apparatus 1900 for facilitating brewing of beverages in a container, in accordance with some embodiments.

Further, the apparatus 1900 may include an apparatus container 1902 comprising a base cap and a side wall. Further, the side wall extends between a top end and a bottom end. Further, the side wall defines an interior space extending between the top end and the bottom end. Further, the bottom end defines a bottom opening of the apparatus container 1902. Further, the base cap may be configured for transitioning the bottom opening between one or more open states and a closed state. Further, at least one portion of the side wall includes two or more openings. Further, the apparatus container 1902 may be configured to be disposed in the container with the bottom opening in the closed state for brewing one or more beverages in the container. Further, one or more brewing fluids disposed in the container move between the container and the interior space through one or more of the two or more openings. Further, the apparatus container 1902 may be configured for receiving one or more beverage ingredients in the interior space. Further, the apparatus 1900 may include a plunger assembly 1904 coupled to the top end of the side wall. Further, the plunger assembly 1904 includes a plunger handle and a plunger head. Further, the plunger assembly 1904 may be configured for moving the plunger head in the interior space based on one or more forces applied to the plunger handle. Further, the brewing of the one or more beverages may be further based on the moving of the plunger head in the interior space of the apparatus container 1902. Further, the apparatus 1900 may include a flow control mechanism coupled with the apparatus container 1902. Further, the flow control mechanism includes a flow control element and a flow control actuator. Further, the flow control actuator may be configured for transitioning the flow control element between an engaged state and a disengaged state. Further, the flow control element may be configured for removably covering the two or more openings based on the transitioning of the flow control element between the engaged state and the disengaged state for modulating a movement of the one or more brewing fluids between the container and the interior space through one or more of the two or more openings.

FIG. 20 illustrates the base cap 202 removably coupled to the side wall 204, in accordance with some embodiments.

In some embodiments, the base cap 202 may be coupled to the side wall 204 using a coupling element. Further, the coupling element may include a hinge, etc. Further, the base cap 202 may be transitionable between one or more opened positions and a closed position. Further, the transitioning of the bottom opening 210 between the one or more open states and the closed state may be further based on the transitioning of the base cap 202 between the one or more opened positions and the closed position.

In some embodiments, the base cap 202 may be removably coupled to the side wall 204 using the coupling element.

In some embodiments, the base cap 202 includes a base wall. Further, one or more base wall portions of the base wall include two or more second openings 2004. Further, the one or more base wall portions may be configured for allowing the one or more brewing fluids disposed in the container 2302 to move between the container 2302 and the interior space 212 through one or more of the two or more second openings 2004 in the closed state of the bottom opening 210.

In some embodiments, the apparatus 100 may further include a second flow control mechanism coupled with the base cap 202. Further, the second flow control mechanism includes a second flow control element and a second flow control actuator. Further, the second flow control element includes the flow control element 1102. Further, the second flow control actuator may be configured for transitioning the second flow control element between an engaged state and a disengaged state. Further, the base cap 202 includes one or more one-way valves 1402. Further, the second flow control element may be configured for removably covering the two or more second openings 2004 based on the transitioning of the second flow control element between the engaged state and the disengaged state for modulating a movement of the one or more brewing fluids between the container 2302 and the interior space 212 through the one or more one-way valves 1402.

In some embodiments, the covering of the two or more second openings 2004 transitions the two or more second openings 2004 to a closed state. Further, the one or more brewing fluids do not move between the container 2302 and the interior space 212 through the two or more second openings 2004 based on the closed state of the two or more second openings 2004. Further, at least one of the upward motion and the downward motion of the plunger head 304 based on the closed state of the two or more second openings 2004 increases a pressure in the interior space 212 from an original level to one or more increased levels. Further, the brewing of the one or more beverages may be further based on the increase in the pressure. Further, the one or more brewing fluids may move from the container 2302 to the interior space 212 through the one or more one-way valves 1402. Further, the one or more one-way valves 1402 may be transitionable between a first state and a second state. Further, the one or more one-way valves 1402 allow the movement of the one or more brewing fluids from the container 2302 to the interior space 212, and restrict the movement of the one or more brewing fluids from the interior space 212 to the container 2302 through the one or more one-way valves 1402 in the first state. Further, the one or more one-way valves 1402 allow the movement of the one or more brewing fluids from the interior space 212 to the container 2302, and restrict the movement of the one or more brewing fluids from the container 2302 to the interior space 212 through the one or more one-way valves 1402 in the second state.

In some embodiments, the base cap 202 includes a cap base wall 2002 and a cap side wall 2006 extending from the cap base wall 2002. Further, a first end 2008 of the cap side wall 2006 may be peripherally attached to the cap base wall 2002. Further, the base cap 202 includes a first threaded portion 2012 disposed proximal to a second end 2010 of the cap side wall 2006. Further, the apparatus container 102 includes a second threaded portion 2014 disposed proximal to the bottom end 208 of the side wall 204. Further, the first threaded portion 2012 of the cap side wall 2006 may be configured to be threadedly engaged and disengaged from the second threaded portion 2014 of the side wall 204 for removably coupling the base cap 202 to the side wall 204. Further, the transitioning of the bottom opening 210 between the one or more open states and the closed state may be further based on the removably coupling.

FIG. 21 is a front view of the plunger assembly 104 of the apparatus 100, in accordance with some embodiments.

In some embodiments, the plunger assembly 104 includes an end cap 2112. Further, the coupling of the plunger assembly 104 with the top end 206 of the side wall 204 includes coupling the end cap 2112 with the top end 206 of the side wall 204. Further, the end cap 2112 defines an end cap interior space.

In some embodiments, the plunger assembly 104 further includes a plunger sleeve 2102 and a plunger rod 2104. Further, the plunger sleeve 2102 includes an internal chamber 2106 extending between a first open end 2108 of the plunger sleeve 2102 and a second open end 2110 of the plunger sleeve 2102. Further, the second open end 2110 may be attached to an outer surface 2114 of the end cap 2112 around an end cap opening 2116 disposed on the end cap 2112. Further, the plunger rod 2104 may be movably disposed in the internal chamber 2106 of the plunger sleeve 2102. Further, the plunger rod 2104 extends between a first rod end 2118 and a second rod end 2120. Further, the second rod end 2120 may be attached to the plunger head 304 on a top side of the plunger head 304 by extending through the end cap opening 2116 and the first rod end 2118 may be attached to the plunger handle 302 on a bottom side of the plunger handle 302. Further, the plunger rod 2104 moves in the internal chamber 2106 from a first position to one or more second positions in the internal chamber 2106 based on the one or more forces for the moving of the plunger head 304.

FIG. 22 is an exploded view of the apparatus 100, in accordance with some embodiments.

In some embodiments, the moving of the plunger head 304 in the interior space 212 based on the one or more forces applied to the plunger handle 302 includes moving the plunger head 304 in the interior space 212 based on the one or more forces applied by one or more users on the plunger handle 302. Further, the plunger assembly 104 further includes one or more finger-grip beads coupled with the first open end 2108 of the plunger sleeve 2102. Further, the finger-grip bead may be configured for providing a grip for the one or more users during the applying of the one or more forces on the plunger handle 302.

FIG. 23 is a front view of the apparatus 100 disposed in the container 2302 for the brewing of the at least one beverage in the container 2302, in accordance with some embodiments.

FIG. 24 is a front view of the apparatus 100 disposed in the container 2302 for the brewing of the at least one beverage in the container 2302 based on the at least one force applied to the plunger head 304 by a hand of the user, in accordance with some embodiments. Further, the at least one force applied to the plunger head 304 may be based on at least one pressing action applied by the user on the plunger assembly 104. Further, the plunger head 304 moves by the application of the at least one pressing action.

FIG. 25 is a front view of the apparatus 100 removed from the container 2302 after the brewing of the at least one beverage in the container 2302, in accordance with some embodiments.

In some embodiments, the plunger assembly 104 includes a third threaded portion disposed proximal to the first rod end 2118 of the plunger rod 2104. Further, the plunger handle 302 includes a hole extending into the plunger handle 302. Further, the plunger handle 302 includes a fourth threaded portion disposed on an inner surface of the hole. Further, the third threaded portion of the plunger rod 2104 may be threadedly engaged with the fourth threaded portion of the plunger handle 302 for the attaching of the plunger rod 2104 with the plunger handle 302.

In some embodiments, the apparatus 100 may further include a stop collar movably disposed on the plunger rod 2104 proximal to the first rod end 2118 of the plunger rod 2104. Further, the plunger sleeve 2102 includes a stopping element disposed on the plunger sleeve 2102 proximal to the first open end 2108 of the plunger sleeve 2102. Further, the stop collar interfaces with the stopping element for limiting the moving of the plunger rod 2104 into the internal chamber 2106 to a moving limit. Further, the limiting of the moving of the plunger rod 2104 limits a distance of the moving of the plunger head 304 from the end cap interior space to the interior space 212 by the moving limit.

FIG. 26 illustrates the base cap 202 removably coupled to the side wall 204 using a bayonet connector, in accordance with some embodiments.

In some embodiments, the removably coupling of the base cap 202 with the side wall 204 using the coupling element includes removably coupling the base cap 202 with the side wall 204 using a bayonet connector. Further, the bayonet connector includes two or more lugs 2602 disposed proximal to the bottom end 208 of the side wall 204. Further, the bayonet connector further includes two or more J-shaped slots 2604 disposed proximal to the second end 2010 of the cap side wall 2006. Further, the two or more J-shaped slots 2604 may be configured to mechanically engage with the two or more lugs 2602. Further, the removably coupling of the base cap 202 with the side wall 204 using the bayonet connector may be further based on the mechanical engagement of the two or more J-shaped slots 2604 with the two or more lugs 2602.

Further, the plunger assembly 104 may be a plunger system. Further, the plunger assembly 104 may include a plunger handle 302 and a plunger head 304. Further, the plunger assembly 104 may be configured for moving the plunger head 304 into the interior space 212 of the apparatus container 102 based on one or more forces applied to the plunger handle 302. Further, the one or more forces may be a downward force. Further, the downward force may be applied to the plunger handle 302 by a user with a hand. Further, the user may apply a pushing action to the plunger handle 302 to apply the downward force. Further, the moving of the plunger head 304 extracts flavors and/or oils from the one or more beverage ingredients and mixes the flavors and/or oils with the one or more brewing fluids. Further, the one or more brewing fluids move into the interior space 212 through the plurality of openings in the filter portion to mix with the one or more beverage ingredients and gain the flavors and/or oils for increasing density and/or intensity of the one or more brewing fluids and moves out of the interior space 212 to the container after gaining the flavors and/or oils through the plurality of openings without the one or more beverage ingredients based on the moving of the plunger head 304 for the brewing of the one or more beverages. Further, the side wall 204 restricts a movement of the one or more beverage ingredients along the one or more brewing fluids from the interior space 212 during the moving of the plunger head 304. Further, the moving of the plunger head 304 may be repeated a number of times to subsequently increase the density and/or intensity of the one or more brewing fluids until the one or more beverages may be prepared in the container 2302 of a preferred density and/or intensity.

Further, in an embodiment, the plunger assembly 104 may include a spring 2122 coupled with the plunger rod 2104. Further, the spring 2122 may be disposed in the internal chamber 2106 of the plunger sleeve 2102. Further, the spring 2122 may include a first spring end 2124 and a second spring end 2126. Further, the first spring end 2124 may be attached to the plunger handle 302 on the bottom side of the plunger handle 302 and the second spring end 2126 may be attached to the second open end 2110 of the plunger sleeve 2102. Further, the spring 2122 may be configured for transitioning from an extended state to a compressed state based on the one or more forces for facilitating the moving of the plunger head 304 from the cap interior space to the interior space 212. Further, the spring 2122 may be configured for transitioning from the compressed state to the extended state based on a removal of the one or more forces for moving the plunger head 304 from the interior space 212 to the cap interior space by moving the plunger rod 2104 from the one or more second positions to the first position.

Further, in an embodiment, the plunger handle 302 may include a handle top and a handle rod coupled with the handle top. Further, the handle rod extends between a first handle end and a second handle end. Further, the spring 2122 and the plunger rod 2104 may be attached to the second handle end of the handle rod. Further, the handle rod moves in the internal chamber 2106 based on the one or more forces. Further, the moving of the handle rod moves the plunger head 304.

Further, in some embodiments, the plunger assembly 104 may be detachably coupled with the apparatus container 102.

Further, in some embodiments, the apparatus container 102 may be comprised of a stainless steel material.

Further, in some embodiments, a size of each of the plurality of openings of the filter portion may be at least 200 microns.

In some embodiments, the present disclosure provides an apparatus facilitating brewing of beverages in a container. Further, the apparatus may include an apparatus container comprising a base cap and a side wall. Further, the side wall extends between a top end and a bottom end. Further, the side wall defines an interior space extending between the top end and the bottom end. Further, the bottom end defines a bottom opening of the apparatus container. Further, the base cap includes one or more one-way valves. Further, the base cap may be configured for transitioning the bottom opening between one or more open states and a closed state. Further, the apparatus container may be configured to be disposed in the container with the bottom opening in the closed state for brewing one or more beverages in the container. Further, at least one brewing fluid disposed in the container moves between the container and the interior space through the one or more one-way valves. Further, the apparatus container may be configured for receiving one or more beverage ingredients in the interior space. Further, the apparatus may include a plunger assembly coupled to the top end of the side wall. Further, the plunger assembly includes a plunger handle and a plunger head. Further, the plunger assembly may be configured for moving the plunger head in the interior space based on one or more forces applied to the plunger handle. Further, the brewing of the one or more beverages may be further based on the moving of the plunger head in the interior space of the apparatus container.

Although the invention has been explained in relation to its preferred embodiment, it is to be understood that many other possible modifications and variations can be made without departing from the spirit and scope of the invention as hereinafter claimed.

What is claimed is:

1. An apparatus facilitating brewing of beverages in a container, the apparatus comprising:

an apparatus container comprising a base cap and a side wall, wherein the side wall extends between a top end and a bottom end, wherein the side wall defines an interior space extending between the top end and the bottom end, wherein the bottom end defines a bottom opening of the apparatus container, wherein the base cap is configured for transitioning the bottom opening between at least one opened state and a closed state, wherein at least one portion of the side wall comprises a plurality of openings, wherein the apparatus container is configured to be disposed in the container with the bottom opening in the closed state for brewing at least one beverage in the container, wherein at least one brewing fluid disposed in the container moves between the container and the interior space through at least one of the plurality of openings, wherein the apparatus container is configured for receiving at least one beverage ingredient in the interior space; and a plunger assembly coupled to the top end of the side wall, wherein the plunger assembly comprises a plunger handle and a plunger head, wherein the plunger assembly is configured for moving the plunger head in the interior space based on at least one force applied to the plunger handle, wherein the brewing of the at least one beverage is further based on the moving of the plunger head in the interior space of the apparatus container, wherein the side wall comprises a cylindrical side wall, wherein the plunger head comprises a circular plate, wherein an outer edge of the circular plate is radially spaced inward from an inner surface of the side wall, wherein the plunger head comprises a scraping element coupled with the circular plate, wherein the scraping element radially extends outwards for radially interfacing with the inner surface of the side wall, wherein the circular plate comprises a radial cavity around the circular plate, wherein the scraping element is configured to be disposed in the radial cavity, wherein the scraping element is configured for transitioning between an extended position and a retracted position, wherein the scraping element radially extends outwards for the radially interfacing with the inner surface of the side wall in the extended position, wherein the scraping element radially retracts in the radial cavity in the retracted position.

2. The apparatus of claim 1, wherein the apparatus container comprises a first side wall contactingly disposed with the side wall, wherein the side wall and the first side wall are movably coupled using a wall coupling element, wherein at least one first portion of the first side wall comprises a plurality of first openings, wherein the first side wall is configured to be transitionable between a plurality of relative positions in relation to the side wall for varying a degree of overlap of the plurality of openings with the plurality of first openings, wherein the degree of overlap defines an effective open area of the plurality of openings, wherein the at least one brewing fluid moves between the container and the interior space through the effective open area of at least one of the plurality of openings.

3. The apparatus of claim 2, wherein the side wall comprises one or more wall regions disposed between two or more adjacent openings of the plurality of openings, wherein the first side wall comprises one or more first wall regions disposed between two or more first adjacent openings of the plurality of first openings, wherein the first side wall is further configured to be transitionable between the plurality of relative positions in relation to the side wall for varying a degree of occlusion of the plurality of openings by the one or more first wall regions, wherein the degree of occlusion of the plurality of openings further defines the effective open area of the plurality of openings.

4. The apparatus of claim 2, wherein the side wall and the first side wall are cylindrical, wherein the first side wall is coaxially disposed around the side wall, wherein the transitioning of the first side wall between the plurality of relative positions in relation to the side wall comprises rotating the first side wall between the plurality of relative positions in relation to the side wall.

5. The apparatus of claim 2 further comprising an indexing element configured for positioning the first side wall at each of the plurality of relative positions in relation to the side wall, wherein each of the plurality of relative positions corresponds to a respective value of the effective open area of the plurality of openings, wherein the indexing element is comprised in the first side wall, wherein the side wall comprises a plurality of markings, wherein the plurality of markings correspond to a respective one of the plurality of relative positions, wherein the indexing element is alignable with each of the plurality of markings for the positioning of the first side wall at each of the plurality of relative positions.

6. The apparatus of claim 1, wherein the moving of the plunger head comprises a downward motion of the plunger head in the interior space, and an upward motion of the plunger head in the interior space, wherein the plunger assembly further comprises a skirting element disposed around the outer edge of the circular plate, wherein the skirting element radially extends outward from the circular plate, wherein the skirting element is configured for radially engaging with the inner surface of the side wall to form a radial seal with the inner surface in the downward motion, wherein the skirting element is configured for radially disengaging from the inner surface of the side wall in the upward motion.

7. The apparatus of claim 1, wherein the plunger head comprises at least one mounting element and at least one blade, wherein the at least one blade is movably coupled to the at least one mounting element, wherein the moving of the plunger head comprises moving the at least one blade in the interior space.

8. The apparatus of claim 1, wherein the plunger assembly comprises at least one blade coupled to the plunger head, wherein the moving of the plunger head comprises moving the plunger head and the at least one blade in the interior space, wherein the at least one blade is configured for agitating at least a portion of the at least one brewing fluid comprised in the interior space, wherein the brewing of the at least one beverage in the container is further based on the agitating.

9. The apparatus of claim 1 further comprising a flow control mechanism coupled with the apparatus container, wherein the flow control mechanism comprises a flow control element and a flow control actuator, wherein the flow control actuator is configured for transitioning the flow control element between an engaged state and a disengaged state, wherein the flow control element is configured for removably covering the plurality of openings based on the transitioning of the flow control element between the engaged state and the disengaged state for modulating a movement of the at least one brewing fluid between the container and the interior space through at least one of the plurality of openings.

10. The apparatus of claim 9, wherein the modulating comprises allowing a movement of the at least one brewing fluid between the container and the interior space through at least one of the plurality of openings in the disengaged state, and restricting the movement of the at least one brewing fluid between the container and the interior space through at least one of the plurality of openings in the engaged state.

11. The apparatus of claim 9, wherein the flow control element comprises at least one one-way valve, wherein the restricting of the movement of the at least one brewing fluid between the container and the interior space through at least one of the plurality of openings in the engaged state comprises allowing an outward movement of the at least one brewing fluid from the interior space to the container through at least one of the plurality of openings, and restricting an inward movement of the at least one brewing fluid from the container to the interior space through at least one of the plurality of openings in the engaged state.

12. The apparatus of claim 9, wherein the base cap comprises at least one one-way valve, wherein the moving of the plunger head comprises a downward motion of the plunger head in the interior space, and an upward motion of the plunger head in the interior space, wherein the base cap is configured for allowing a movement of the at least one brewing fluid from the container to the interior space through the at least one one-way valve during the upward motion of the plunger head based on the closed state of the bottom opening, wherein the base cap is further configured for restricting a movement of the at least one brewing fluid from the interior space to the container through the at least one one-way valve during the downward motion of the plunger head based on the closed state of the bottom opening.

13. The apparatus of claim 9, wherein the flow control element comprises at least one of a wall, a membrane, a sleeve, a valve, and a filter.

14. The apparatus of claim 1, wherein the base cap is coupled to the side wall using a coupling element, wherein the base cap is transitionable between at least one opened position and a closed position, wherein the transitioning of the bottom opening between the at least one opened state and the closed state is further based on the transitioning of the base cap between the at least one opened position and the closed position.

15. An apparatus facilitating brewing of beverages in a container, the apparatus comprising:

an apparatus container comprising a base cap and a side wall, wherein the side wall extends between a top end and a bottom end, wherein the side wall defines an interior space extending between the top end and the bottom end, wherein the bottom end defines a bottom opening of the apparatus container, wherein the base cap is configured for transitioning the bottom opening between at least one opened state and a closed state, wherein at least one portion of the side wall comprises a plurality of openings, wherein the apparatus container is configured to be disposed in the container with the bottom opening in the closed state for brewing at least one beverage in the container, wherein at least one brewing fluid disposed in the container moves between the container and the interior space through at least one of the plurality of openings, wherein the apparatus container is configured for receiving at least one beverage ingredient in the interior space, wherein the apparatus container comprises a first side wall contactingly disposed with the side wall, wherein the side wall and the first side wall are movably coupled using a wall coupling element, wherein at least one first portion of the first side wall comprises a plurality of first openings, wherein the first side wall is configured to be transitionable between a plurality of relative positions in relation to the side wall for varying a degree of overlap of the plurality of openings with the plurality of first openings, wherein the degree of overlap defines an effective open area of the plurality of openings, wherein the at least one brewing fluid moves between the container and the interior space through the effective open area of at least one of the plurality of openings; and a plunger assembly coupled to the top end of the side wall, wherein the plunger assembly comprises a plunger handle and a plunger head, wherein the plunger assembly is configured for moving the plunger head in the interior space based on at least one force applied to the plunger handle, wherein the brewing of the at least one beverage is further based on the moving of the plunger head in the interior space of the apparatus container, wherein the side wall comprises a cylindrical side wall, wherein the plunger head comprises a circular plate, wherein an outer edge of the circular plate is radially spaced inward from an inner surface of the side wall, wherein the plunger head comprises a scraping element coupled with the circular plate, wherein the scraping element radially extends outwards for radially interfacing with the inner surface of the side wall, wherein the circular plate comprises a radial cavity around the circular plate, wherein the scraping element is configured to be disposed in the radial cavity, wherein the scraping element is configured for transitioning between an extended position and a retracted position, wherein the scraping element radially extends outwards for the radially interfacing with the inner surface of the side wall in the extended position, wherein the scraping element radially retracts in the radial cavity in the retracted position.

16. An apparatus facilitating brewing of beverages in a container, the apparatus comprising:

an apparatus container comprising a base cap and a side wall, wherein the side wall extends between a top end and a bottom end, wherein the side wall defines an interior space extending between the top end and the bottom end, wherein the bottom end defines a bottom opening of the apparatus container, wherein the base cap is configured for transitioning the bottom opening between at least one opened state and a closed state, wherein at least one portion of the side wall comprises a plurality of openings, wherein the apparatus container is configured to be disposed in the container with the bottom opening in the closed state for brewing at least one beverage in the container, wherein at least one brewing fluid disposed in the container moves between the container and the interior space through at least one of the plurality of openings, wherein the apparatus container is configured for receiving at least one beverage ingredient in the interior space;

a plunger assembly coupled to the top end of the side wall, wherein the plunger assembly comprises a plunger handle and a plunger head, wherein the plunger assembly is configured for moving the plunger head in the interior space based on at least one force applied to the plunger handle, wherein the brewing of the at least one beverage is further based on the moving of the plunger head in the interior space of the apparatus container, wherein the side wall comprises a cylindrical side wall, wherein the plunger head comprises a circular plate, wherein an outer edge of the circular plate is radially spaced inward from an inner surface of the side wall, wherein the plunger head comprises a scraping element coupled with the circular plate, wherein the scraping element radially extends outwards for radially interfacing with the inner surface of the side wall, wherein the circular plate comprises a radial cavity around the circular plate, wherein the scraping element is configured to be disposed in the radial cavity, wherein the scraping element is configured for transitioning between an extended position and a retracted position, wherein the scraping element radially extends outwards for the radially interfacing with the inner surface of the side wall in the extended position, wherein the scraping element radially retracts in the radial cavity in the retracted position; and a flow control mechanism coupled with the apparatus container, wherein the flow control mechanism comprises a flow control element and a flow control actuator, wherein the flow control actuator is configured for transitioning the flow control element between an engaged state and a disengaged state, wherein the flow control element is configured for removably covering the plurality of openings based on the transitioning of the flow control element between the engaged state and the disengaged state for modulating a movement of the at least one brewing fluid between the container and the interior space through at least one of the plurality of openings.

\*  \*  \*  \*  \*